(12) United States Patent
Lee et al.

(10) Patent No.: US 7,567,425 B1
(45) Date of Patent: Jul. 28, 2009

(54) MULTILAYER CHIP CAPACITOR

(75) Inventors: Byoung Hwa Lee, Gyunggi-do (KR); Sung Kwon Wi, Seoul (KR); Hong Yeon Cho, Gyunggi-do (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/339,839

(22) Filed: Dec. 19, 2008

(30) Foreign Application Priority Data

Aug. 7, 2008 (KR) ...................... 10-2008-0077428

(51) Int. Cl.
*H01G 4/228* (2006.01)
(52) U.S. Cl. .............. 361/306.3; 361/306.1; 361/321.1; 361/321.2; 361/306.2; 361/308.1
(58) Field of Classification Search .............. 361/306.3, 361/306.1, 306.2, 302–305, 307, 308.1, 309, 361/311–313, 321.1, 321.2, 301.2, 301.4
See application file for complete search history.

(56) References Cited

U.S. PATENT DOCUMENTS

| | | | |
|---|---|---|---|
| 6,327,134 B1 * | 12/2001 | Kuroda et al. ............... | 361/303 |
| 6,331,929 B1 * | 12/2001 | Masuda ....................... | 361/303 |
| 6,519,134 B1 * | 2/2003 | Li et al. ..................... | 361/306.1 |
| 6,587,327 B1 * | 7/2003 | Devoe et al. .............. | 361/306.3 |
| 7,046,500 B2 * | 5/2006 | Lee et al. .................... | 361/303 |
| 7,433,172 B2 * | 10/2008 | Togashi .................... | 361/306.1 |
| 2008/0291600 A1 * | 11/2008 | Takashima et al. ........ | 361/306.1 |

FOREIGN PATENT DOCUMENTS

| | | |
|---|---|---|
| JP | 2006-286731 | 10/2006 |
| JP | 2007-142296 | 6/2007 |

* cited by examiner

*Primary Examiner*—Nguyen T Ha
(74) *Attorney, Agent, or Firm*—McDermott Will & Emery LLP

(57) ABSTRACT

There is provided a multilayer chip capacitor including: a capacitor body including first and second capacitor units; and first to fourth outer electrodes, wherein the first capacitor unit includes at least one pair of first and second inner electrodes, the second capacitor unit includes at least one pair of third and fourth inner electrodes, an alternate laminated portion is formed in one area within the capacitor body, the alternate laminated portion having the first to fourth inner electrodes sequentially laminated therein, and a capacitance adjusting portion is formed in another area within the capacitor body, the capacitance adjusting portion having at least one of the one pair of first and second inner electrodes and the one pair of third and fourth inner electrodes laminated repeatedly.

28 Claims, 24 Drawing Sheets

MULTILAYER CHIP CAPACITOR

CROSS-REFERENCE TO RELATED APPLICATIONS

This application claims the priority of Korean Patent Application No. 2008-0077428 filed on Aug. 7, 2008, in the Korean Intellectual Property Office, the disclosure of which is incorporated herein by reference.

BACKGROUND OF THE INVENTION

1. Field of the Invention

The present invention relates to a multilayer chip capacitor, and more particularly, to a multilayer chip capacitor suitably used as a decoupling capacitor of a power distribution network of a microprocessor unit (MPU) and capable of reducing a power distribution network impedance to a target impedance or less in a broad frequency range as a single capacitor.

2. Description of the Related Art

A power distribution network (PDN) of a micro processor unit (MPU) is designed with increasing difficulty due to higher speed and more integration of the MPU. Notably, a decrease in a power voltage and an increase in an MPU consumption current resulting from more integration of the MPU has been gradually lowering a target impedance $Z_{target}$, as represented by following Equation 1:

$$Z_{target} = Vp \times AR/I = Vr/I \quad \text{Equation 1,}$$

where Vp is a power voltage, AR is an allowed ripple, I is an MPU consumption current, an Vr is an allowed ripple voltage.

A general ripple voltage Vr is a value equal to 5-10% of the power voltage. The target impedance $Z_{target}$ should be satisfied not only in a direct current (DC) but also in all frequencies where a transient current is present. A personal computer (PC) or a laptop computer undergoes a transient current even in a very high frequency range due to higher speed of a central processing unit (CPU), i.e., MPU chip and thus should satisfy a target impedance even in a broad frequency range. To satisfy the target impedance in each frequency range, the PDN employs a voltage regulator module (VRM), a bulk capacitor, a general two-terminal MLCC and a low equivalent series inductance (ESL) MLCC. This PDN is referred to as a multistage PDN (see FIG. 23B).

The VRM, bulk capacitor and general two-terminal multilayer chip capacitor (MLCC) supply a current in a frequency range of several kHz, several kHz to hundreds of kHz, hundreds of kHz to several MHz, respectively and serve to lower impedance of the PDN. Unlike the bulk capacitor or general two-terminal MLCC directly installed on a motherboard, the low ESL MLCC is typically installed on a CPU package to supply a current in a frequency range of at least several MHz and reduce impedance. Finally, a die capacitor within the CPU supplies a current and lowers impedance of the PDN in a frequency higher than an effective frequency of the low ESL MLCC. The plurality of bulk capacitors, general two-terminal MLCC and low ESL MLCC are connected in parallel to one another.

FIG. 1 is a schematic graph illustrating magnitude of impedance Z with respect to frequency of a general multistage PDN. In each stage, the VRM, bulk capacitor, general two-terminal MLCC, low ESL MLCC and die capacitor have respective impedances $Z_{REG}$, $Z_{BLK}$, $Z_{MF}$, $Z_{PKG}$, and $Z_{DIE}$ determining the impedance of an entire PDN. Accordingly, as shown, impedance of an individual capacitor greatly affects an impedance profile of the entire PDN. Also, an impedance of a previous stage capacitor is associated with an impedance of a next stage capacitor to determine the impedance of the entire PDN. In designing the PDN, an impedance at the each stage cannot be determined independently but the impedance of the entire PDN should be considered. A general two terminal MLCC which has a relatively higher ESL is installed on a motherboard or CPU package for mid-frequency decoupling. Also, a low ESL MLCC is installed in the CPU package for high-frequency decoupling. In a case where the PDN is designed to satisfy impedance characteristics in a wider frequency range, a greater number of decoupling capacitors may be utilized to cover wide frequency ranges (see FIG. 23B).

FIG. 2 schematically illustrates a conventional motherboard apparatus having decoupling capacitors connected thereto by MPU power circuits. Referring to FIG. 2, a CPU, i.e., MPU chip 51 is surface-mounted on a package board 53 to form CPU packages 51 and 53. Theses CPU packages 51 and 53 are surface-mounted onto a motherboard 55. Circuit conductors such as power (PWR) planes, ground (GND) planes, vias are provided inside and on an outer surface of the motherboard 55 and the package board 53 to configure a power circuit. Also, bumps or pins 15 are utilized to electrically connect the components 53 and 55. Decoupling capacitors 10 and 20 of different types according to the frequency range are connected to this power circuit to form a multi-stage PDN. The low ESL MLCC 10 for high-frequency decoupling, for example, a low inductance ceramic capacitor (LICC) or an interdigital capacitor (IDC) may be disposed on a bottom of the CPU package 53. The general MLCC 20 for mid-frequency decoupling may be directly disposed on a top or bottom of the motherboard 55 in the vicinity of the CPU packages 51 and 53, or installed on the bottom of the CPU package 53.

As described above, to form the multi-stage PDN, the capacitors 10 and 20 of different structures according to each frequency range should be employed. Accordingly, mounting surfaces or mounting positions of the capacitor need to be different according to the each frequency range. Moreover, a greater number of the chip capacitors 10 and 20 are required to lower total impedance of the PDN to a target impedance or less.

SUMMARY OF THE INVENTION

An aspect of the present invention provides a multilayer chip capacitor capable of reducing a power distribution network (PDN) impedance to a target impedance or less in a broad frequency range of hundreds of kHz to hundreds of MHz with a smaller number of capacitors.

According to an aspect of the present invention, there is provided a multilayer chip capacitor including: a capacitor body having a plurality of dielectric layers laminated therein, the capacitor body including first and second capacitor units having capacitances different from each other; and first to fourth outer electrodes formed on an outer surface of the capacitor body, wherein the first capacitor unit includes at least one pair of first and second inner electrodes opposing each other while interposing a corresponding one of the dielectric layers, the first and second inner electrodes connected to the first and second outer electrodes, respectively to have polarities different from each other, the second capacitor unit includes at least one pair of third and fourth inner electrodes opposing each other while interposing another corresponding one of the dielectric layers, the third and fourth inner electrodes connected to the third and fourth outer electrodes, respectively to have polarity identical to the first and second inner electrodes, an alternate laminated portion is formed in one area within the capacitor body, the alternate laminated portion having the first to fourth inner electrodes sequentially laminated therein, and a capacitance adjusting portion is formed in another area within the capacitor body, the capacitance adjusting portion having at least one of the one pair of first and second inner electrodes and the one pair of third and fourth inner electrodes laminated repeatedly.

The alternate laminated portion may be disposed in a lower part of the capacitor body and the capacitance adjusting portion is disposed above the alternate laminated portion.

The alternate laminated portion may include two alternate laminated portions disposed on upper and lower parts of the capacitor body, respectively and the capacitance adjusting portion is disposed between the alternate laminated portions. The alternate laminated portions disposed in the upper and lower parts of the capacitor body may be symmetrical to each other about a center of the capacitor body.

The capacitance adjusting portion may include the at least one pair of third and fourth inner electrodes laminated repeatedly. The second capacitor unit may have a capacitance greater than a capacitance of the first capacitor unit.

The one pair of first and second inner electrodes in the first capacitor unit may define one layer, and the one pair of third and fourth inner electrodes in the second capacitor unit may define another layer, wherein an equivalent series inductance (ESL) per layer of the first and second inner electrodes is smaller than an equivalent series inductance per layer of the third and fourth inner electrodes. The one pair of the first and second inner electrodes may be disposed in a lowermost part of the alternate laminated portion.

The first to fourth inner electrodes may include leads for connecting the first to fourth outer electrodes thereto, respectively, wherein the leads of the first and second inner electrodes have widths greater than widths of the leads of the third and fourth inner electrodes.

The first to fourth inner electrodes may include leads for connecting the first to fourth outer electrodes thereto, respectively, wherein the leads of the first and second inner electrodes have widths identical to each other and the leads of the third and fourth inner electrodes have widths identical to each other.

The first and second capacitor units may be electrically insulated from each other.

Adjacent ones of the first to fourth inner electrodes of the alternate laminated portion may have a distance identical to a distance between the alternate laminated portion and the capacitance adjusting portion. This can lead to an increase in capacitance.

The multilayer chip capacitor may include a four-terminal capacitor including a respective one of the first to fourth outer electrodes. The first to fourth inner electrodes may be connected to the first to fourth outer electrodes through one lead, respectively. The first and second outer electrodes may be formed on opposing first and second longer side surfaces of the capacitor body, respectively and the third and fourth outer electrodes may be formed on opposing first and second shorter side surfaces of the capacitor body, respectively.

The first and second outer electrodes may be formed on a first longer side surface and a first shorter side surface adjacent to each other in the capacitor body, respectively, and the third outer electrode may be formed on a second longer side surface opposing the first longer side surface and the fourth outer electrode may be formed on a second shorter side surface opposing the first shorter side surface.

Each of the third and fourth outer electrodes may include two outer electrodes, and the first and second outer electrodes may be formed on opposing first and second longer side surfaces of the capacitor body and the respective two third and fourth outer electrodes may be formed on the first and second longer side surfaces, respectively. The first outer electrode is formed between the two third outer electrodes and the second outer electrode is formed between the two fourth outer electrodes. Each of the first and second outer electrodes may include two outer electrodes.

Each of the third and fourth outer electrodes may include two outer electrodes, the first and second outer electrodes may be formed on opposing first and second longer side surfaces of the capacitor body, respectively and the respective two third and fourth outer electrodes may be formed on the second and first longer side surfaces, respectively. The first outer electrode may be formed between the two fourth outer electrodes and the second outer electrode may be formed between the two third outer electrodes.

Each of the first and second outer electrodes may include two outer electrodes, wherein respective single ones of the first and second outer electrodes are formed on opposing first and second longer side surfaces of the capacitor body, respectively, and each of the third and fourth outer electrodes may include two outer electrodes, wherein respective single ones of the third and fourth outer electrodes are formed on the opposing first and second longer side surfaces of the capacitor body, respectively. On each of the first and second longer side surfaces, the first and second outer electrodes may be disposed between the third and fourth outer electrodes. Corresponding ones of the outer electrodes adjacent to each other on the first and second longer side surfaces, respectively may have polarities different form each other.

Each of the first and second outer electrodes may include four outer electrodes and respective two of the first and second outer electrodes may be formed on opposing first and second longer side surfaces, respectively, and the third and fourth outer electrodes may be formed on opposing first and second shorter side surfaces of the capacitor body. The first and second outer electrodes may be arranged alternately on the first and second longer side surfaces, respectively.

Each of the first and second inner electrodes may include four leads through which the first and second outer electrodes are connected thereto, the leads of the first inner electrodes may be arranged adjacent to the leads of the second inner electrodes in an interdigitated configuration to be connected to corresponding ones of the outer electrodes having identical polarity.

Each of the first and second inner electrodes may include two leads led out to the first and second longer side surfaces, respectively and connected to the first and second outer electrodes, respectively, in the each of the first and second inner electrodes, a corresponding one of the leads led out to the first longer side surface may be arranged shifted to a position corresponding to the outer electrode immediately adjacent thereto, with respect to another corresponding lead led out to the second longer side surface, and in the first capacitor unit, the leads led out to each of the first and second longer side surfaces may be arranged in a zigzag shape with respect to each other along a laminated direction from the longer side surface.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
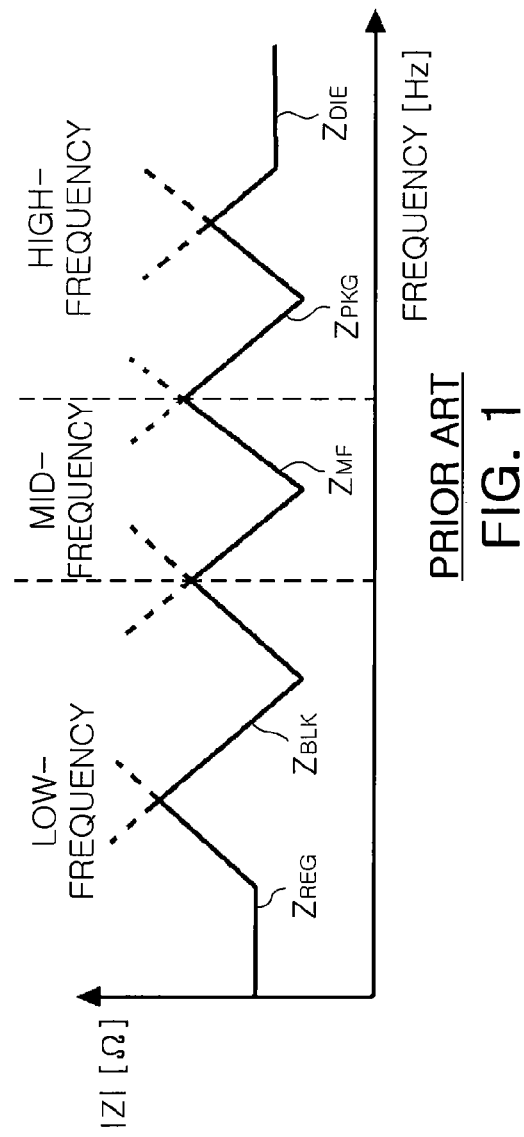
FIG. 1 is a graph schematically illustrating magnitude of impedance Z with respect to frequency of a conventional multi-stage power distribution network (PDN)
Figure 2:
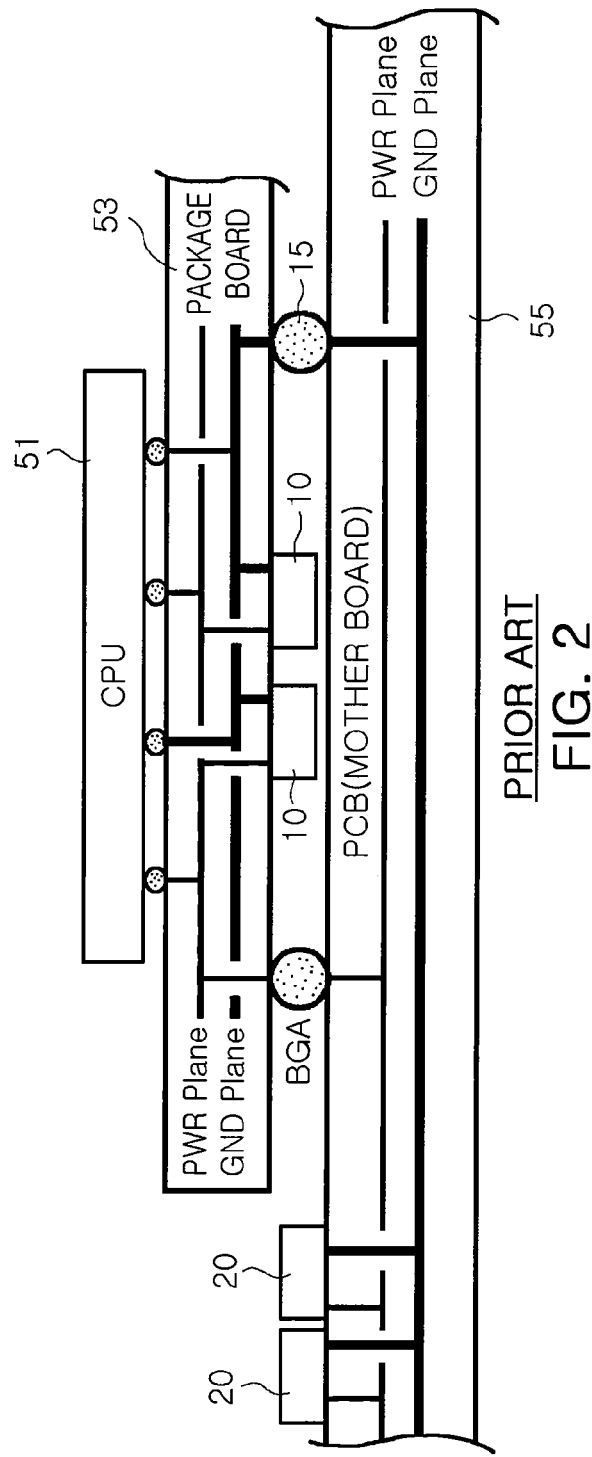
FIG. 2 schematically illustrates a motherboard apparatus in which conventional decoupling capacitors are connected to micro processor unit (MPU)

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate the same or similar components throughout.

Figure 3:
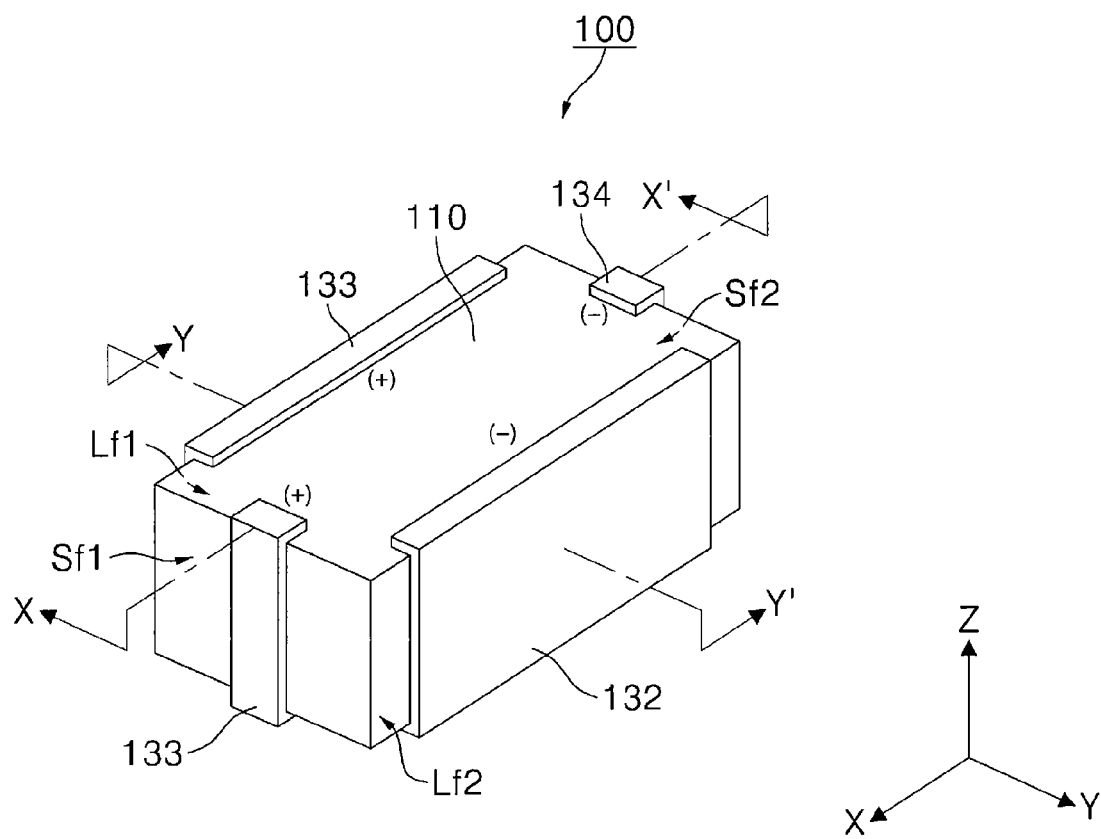
FIG. 3 is a perspective view illustrating an appearance of a multilayer chip capacitor according to an exemplary embodiment of the invention.
Figure 4:
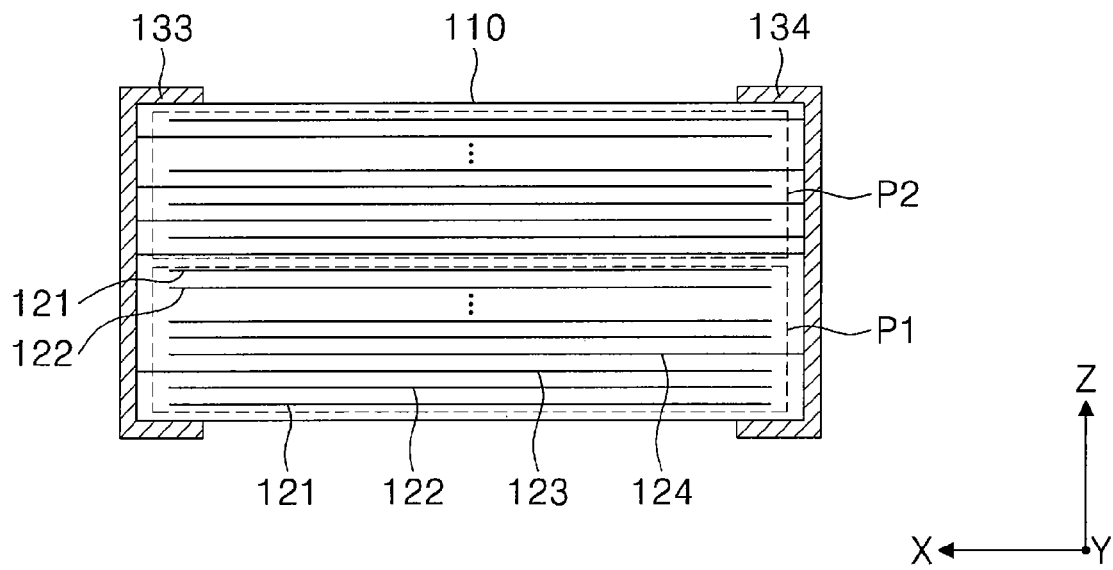
FIG. 4 is a cross-sectional view of the multilayer chip capacitor of FIG. 3, taken along the line X-X'.
Figure 5:
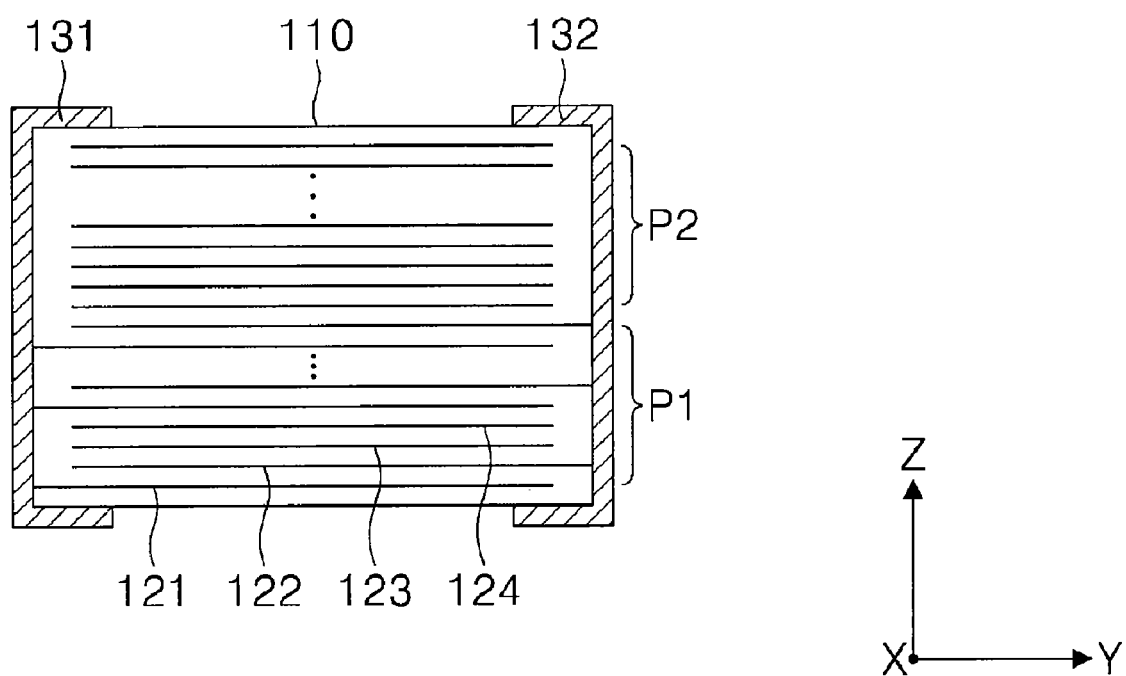
FIG. 5 is a cross-sectional view of the multilayer chip capacitor of FIG. 3, taken along the line Y-Y'.
Figure 6:
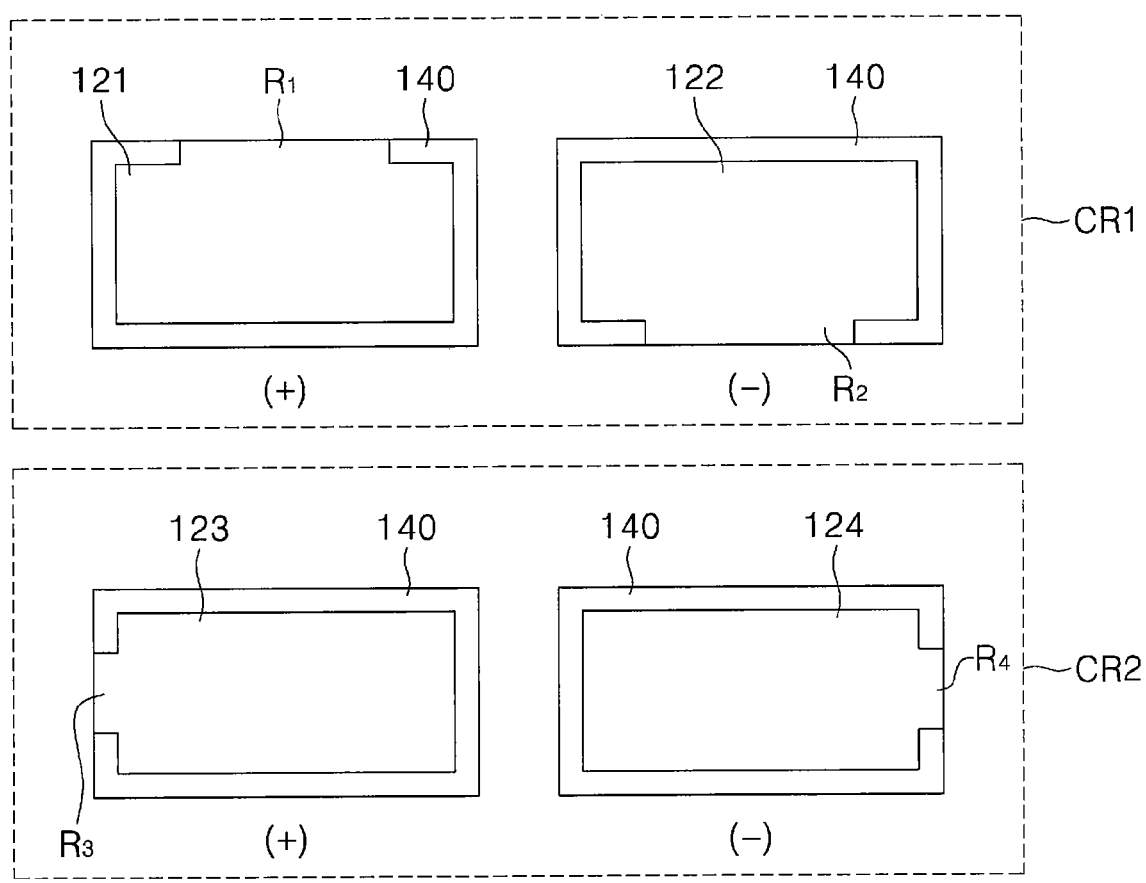
FIG. 6 is a plan view illustrating an inner electrode structure of the capacitor shown in FIG. 3.

FIG. 3 is a perspective view illustrating an appearance of a multilayer chip capacitor according to an exemplary embodiment of the invention. FIG. 4 is a cross-sectional view of the multilayer chip capacitor of FIG. 3, taken along the line X-X'. FIG. 5 is a cross-sectional view of the multilayer chip capacitor of FIG. 3, taken along the line Y-Y'. FIG. 6 is a plan view illustrating an inner electrode structure of the capacitor shown in FIG. 3

Referring to FIGS. 3 to 6, the capacitor 100 includes a capacitor body 110 shaped as a rectangular parallelepiped, and first to fourth outer electrodes 131, 132, 134, and 134 formed on side surfaces of the body. The capacitor body 110 has a plurality of dielectric layers (140 of FIG. 5) laminated therein, and first to fourth inner electrodes 121, 122, 123, and 124 are arranged alternately while interposing a corresponding one of the dielectric layers. The first and second outer electrodes 131 and 132 are disposed on opposing longer ones of the side surfaces Lf1 and Lf2 of the body 110. The third and fourth outer electrodes 133 and 134 are disposed on opposing shorter ones of the side surfaces Sf1 and Sf2.

Here, as shown in FIG. 3, the first and third outer electrodes 131 and 133 have positive (+) polarity and the second and fourth outer electrodes 132 and 134 have negative (−) polarity. The first and second inner electrodes 121 and 122 constitute a first capacitor unit CR1 and the third and fourth inner electrodes 123 and 124 constitute a second capacitor unit CR2. Meanwhile, the multilayer chip capacitor 100 is formed of a four terminal multilayer chip capacitor (MLCC) having the four outer electrodes in total but the present invention is not limited thereto.

As shown in FIGS. 4 and 5, the capacitor body 110 includes two portions P1 and P2 arranged in a laminated direction, i.e. z axis direction. Hereinafter, the two portions P1 and P2 are referred to as an alternate laminated portion P1 and a capacitance adjusting portion P2. First, the alternate laminated portion P1 includes the first and second inner electrodes 121 and 122 of different polarities arranged while interposing a corresponding one of the dielectric layers 140 and the third and fourth inner electrodes 123 and 124 of different polarities arranged while interposing another one of the dielectric layers 140. Here, the first and second inner electrodes 121 and 122 are connected to only first and second outer electrodes 131 and 132, respectively. The third and fourth inner electrodes 123 and 124 are connected to only third and fourth outer electrodes 133 and 134, respectively. This allows the first and second capacitor units CR1 and CR2 to be electrically insulated from each other in the multilayer chip capacitor 100. That is, before the multilayer chip capacitor 100 is mounted on a circuit board, the first and second capacitor units CR1 and CR2 are not electrically connected to each other.

Referring to FIG. 6, the first to fourth inner electrodes 121 to 124 are connected to corresponding ones of the outer electrodes 131 to 134 by leads R1 to R4, respectively. The lead R1 of the first inner electrode has a width identical to a width of the lead R2 of the second inner electrode. The lead R3 of the third inner electrode has a width identical to a width of the lead R4 of the fourth inner electrode. Meanwhile, in the alternate laminated portion P1, the first to fourth inner electrodes 121 to 124 are sequentially and alternately arranged. That is, in the alternate laminated portion P1, the first to fourth inner electrodes 121 to 124 are laminated from a bottom of the capacitor body 110 in an order of 121-122-123-124-121-122-123-124 . . . .

The capacitance adjusting portion P2 is disposed above the alternate laminated portion P1 and has the third and fourth inner electrodes 123 and 124 laminated alternately and repeatedly. The third and fourth inner electrodes 123 and 124 of the capacitance adjusting portion P2 constitute the second capacitor unit CR2 together with the third and fourth inner electrodes 123 and 124 of the alternate laminated portion P1. The first and second inner electrodes 121 and 122 of the alternate laminated portion P1 constitute the first capacitor unit CR1. In the present embodiment, the capacitance adjusting portion P2 is additionally employed to ensure that the first and second capacitor units CR1 and CR2 have different capacitances. This configuration is designed to assure that two or more capacitor units with different capacitances are included in one capacitor body 110. Here, the second capacitor unit CR2 having a greater lamination number of the inner electrodes through the capacitance adjusting portion P2 may have a capacitance greater than a capacitance of the first capacitor unit CR1. However, in place of the third and fourth inner electrodes 123 and 124 constituting the second capacitor unit CR2, the first and second inner electrodes 121 and 122 constituting the first capacitor CR1 may be laminated repeatedly to form the capacitance adjusting portion P1. Furthermore, all of the first to fourth inner electrodes 121 to 124 may be employed to form the capacitance adjusting portion.

Figure 7:
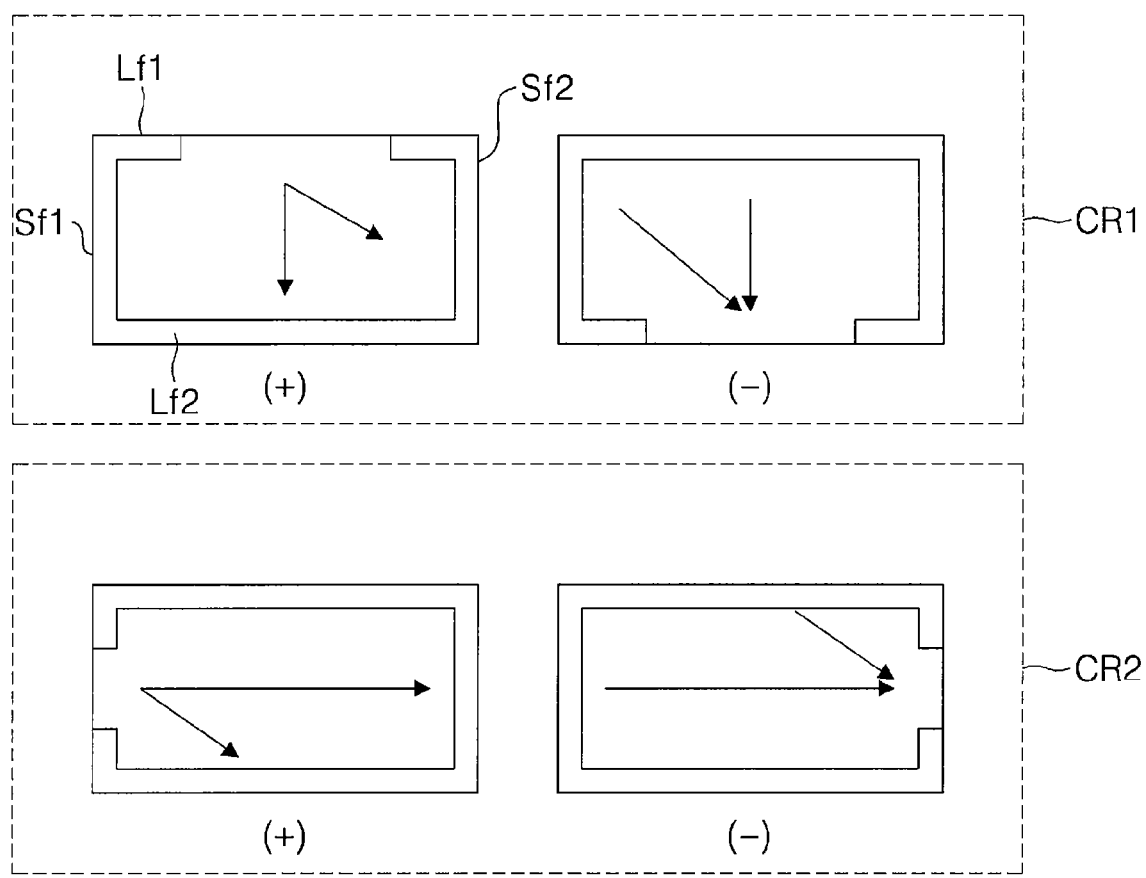
FIG. 7 illustrates a current flow in inner electrodes in a multilayer chip capacitor having first and second capacitor units arranged alternately.
Figure 8:
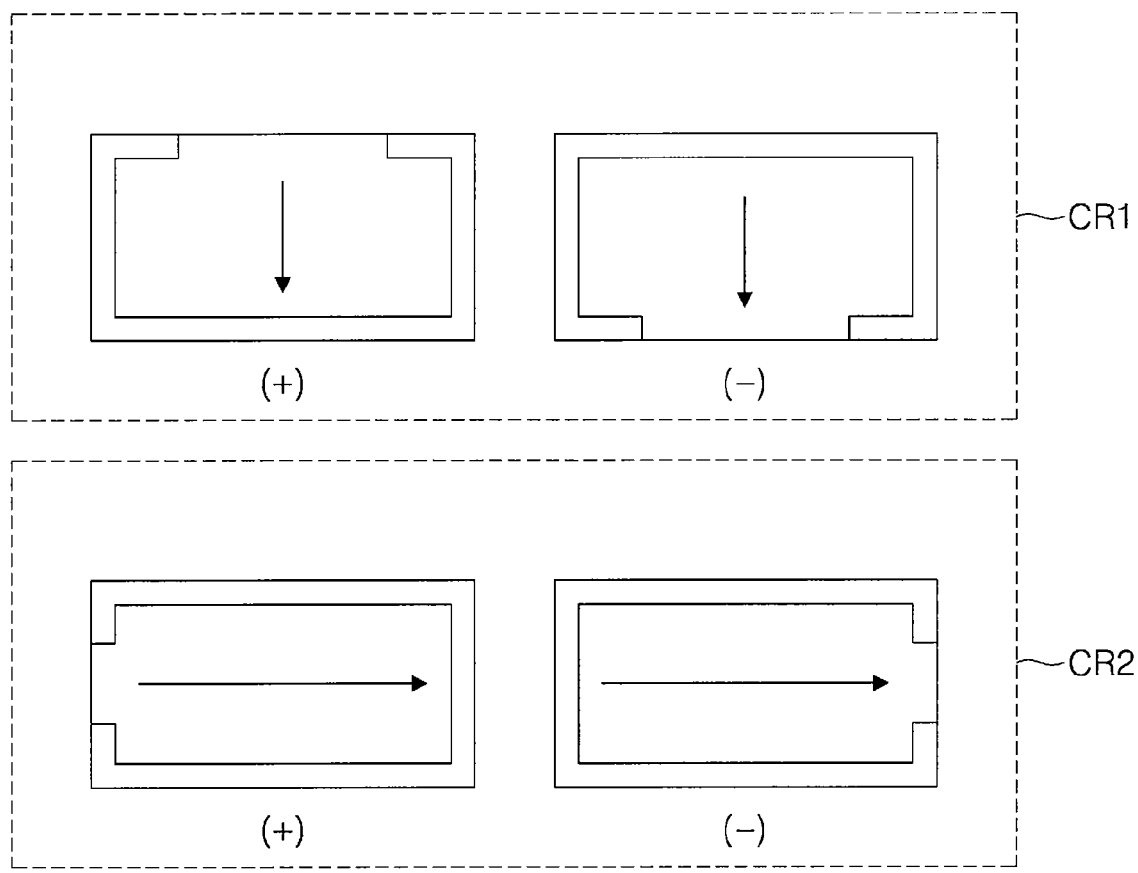
FIG. 8 illustrates a current flow in inner electrodes in a multilayer chip capacitor having first and second capacitor units arranged at a distance from each other.

As described above, in the alternate laminated portion P1, the first and second inner electrodes 121 and 122 of the first capacitor CR1 and the third and fourth inner electrodes 123 and 123 of the second capacitor CR2 are arranged alternately. This allows a current path to occur additionally in each of the inner electrodes 121 to 124 to thereby reduce equivalent series inductance (ESL). FIG. 7 illustrates a current flow in inner electrodes in a multilayer chip capacitor having first and second capacitor units arranged alternately. FIG. 8 illustrates a current flow in inner electrodes in a multilayer chip capacitor having first and second capacitor units arranged at a distance from each other.

First, referring to FIG. 8, in a case where the first and second capacitor units are spaced at a distance from each other, i.e., in a lamination configuration of (121-122-121-122 . . . )/(123-124-123-124 . . . ), a current path of one direction is formed in each of inner electrodes. On the contrary, referring to FIG. 7, in a case where the first and second capacitor units are arranged alternately, an inner electrode of negative polarity in the second capacitor unit is disposed adjacent to an inner electrode of positive polarity in the first capacitor unit. This allows a current path (Lf1→Sf2) other than the current path (Lf→Lf2) to be additionally formed in the each of the inner electrodes. This current path additionally formed leads to a reduction in ESL per layer, for example, ESL formed by a pair of the first and second inner electrodes 121 and 122.

Moreover, the capacitance adjusting portion P2 enables the second capacitor unit CR2 with a relatively bigger capacitance to be disposed farther away from a mounting surface than the first capacitor unit CR1, thereby ensuring less increase in ESL. Furthermore, in the present embodiment, the capacitor body 110 includes the first and second capacitor units CR1 and CR2 with different capacitances while capable of being prevented from a decrease in capacitance. In a case where the first and second capacitor units CR1 and CR2 are connected to identical ones of the outer electrodes, the first and second capacitor units CR1 and CR2 need to be spatially separated from each other to ensure different capacitances. In the present embodiment, the first and second capacitor units CR1 and CR2 are electrically insulated from each other, thereby precluding a need for arranging the first and second capacitor units CR1 and CR2 at a predetermined distance in a laminated direction. Accordingly, this increases the number of the inner electrodes included in the capacitor body 110 and subsequently a capacitance of an entire capacitor. As described above, adjacent ones of the first to fourth inner electrodes 121 to 124 in the alternate laminated portion P1 have a distance equal to a distance between the alternate laminated portion P1 and the capacitance adjusting portion P2 to improve capacitance.

Referring to FIG. 6, in the first capacitor unit CR1, the leads R1 and R2 of the inner electrodes 121 and 122 vertically adjacent to each other and having different polarities have a small distance from each other. Meanwhile, in the second capacitor unit CR2, the leads R3 and R4 of the inner electrodes 123 and 124 vertically adjacent to each other and having different polarities have a relatively greater distance from each other. This allows the first capacitor unit CR1 to have an ESL per layer lower than an ESL per layer of the second capacitor unit CR2. Here, the ESL per layer denotes an ESL provided by a pair of the opposing inner electrodes adjacent to each other and having different polarities.

Accordingly, as shown in FIG. 4, the first capacitor unit CR1 including the inner electrode having a short current path and leads of great widths and thus ensuring relatively low ESL is disposed in the greater vicinity of a bottom of the capacitor body 110 than the second capacitor unit CR2. This allows a current flowing in the capacitor at a high frequency to concentrate on the inner electrodes 121 and 122 with a relatively low ESL. This shortens a current path defined by a substantial current loop to maintain an overall ESL at a lower level.

Mostly, a low ESL multilayer chip capacitor (MLCC) has a capacitance smaller than a capacitance of a general two-terminal MLCC employed in an identical motherboard apparatus. Therefore, the laminated number of the inner electrodes 121 and 122 of the first capacitor CR1 may be smaller than the laminated number of the inner electrodes 123 and 124 of the second capacitor CR2. To this end, in the present embodiment, the capacitance adjusting portion P2 is employed to additionally laminate the second capacitor unit CR2 requiring a greater capacitance. This may allow the first capacitor CR1 to have a serial resonant frequency (SRF) higher than a resonant frequency of the second capacitor unit CR2.

In the capacitor 100 described above, the first capacitor unit CR1 serves as a conventional low ESL two-terminal MLCC, i.e., low inductance chip capacitor (LICC). Also, the second capacitor unit CR2 serves as a conventional two terminal MLCC. Therefore, the capacitor 100 integrates the conventional two-terminal MLCC and the low ESL LICC into one chip. Consequently, this single capacitor can reduce a PDN impedance to a target impedance or less in a wide frequency range, for example, hundreds of kHz to hundreds of MHz range. Particularly, as described above, the first and second capacitor units electrically insulated from each other are employed in the one chip. This results in no substantial change in the number of capacitors although the two capacitor units CR1 and CR2 are joined into one chip. This ensures the PND to be easily designed to satisfy target impedance and allows target impedance to be further satisfied.

Moreover, when the decoupling two terminal MLCC mounted on the motherboard and the decoupling low ESL MLCC mounted on the CPU package are integrated into the aforesaid capacitor 100, the number of the decoupling capacitors used in the PDN of the CPU can be significantly decreased. That is, since the second capacitor unit CR2 of the capacitor 100 performs mid-frequency decoupling, an additional two-terminal MLCC is not required for mid-frequency decoupling or the necessary number of the two terminal MLCC can be diminished.

Figure 9:
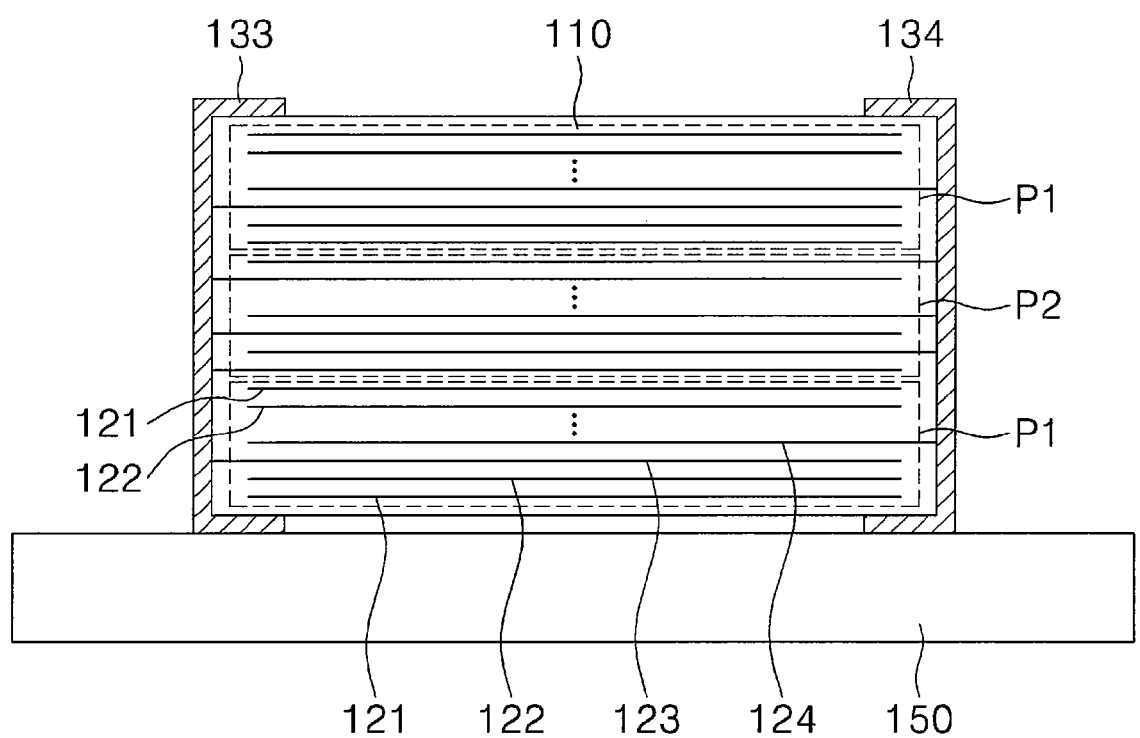
FIG. 9 is a cross-sectional view illustrating a modified example of the multilayer chip capacitor shown in FIG. 3.

FIG. 9 is across-sectional view illustrating a modified example of the multilayer chip capacitor shown in FIG. 3. The multilayer chip capacitor 100' of FIG. 9 is shaped identically to the capacitor of FIG. 3 and can be compared with a cross-sectional view of FIG. 4. Referring to FIG. 9, the multilayer chip capacitor 100' is mounted on a circuit board 150. In the present embodiment, the capacitor body 110' includes two alternate laminated portions P1 and P3 and one capacitance adjusting portion P2. The alternate laminated portions P1 and P3 are disposed in upper and lower parts of the capacitor body 110' while interposing the capacitance adjusting portion P2. Here, a first capacitor unit includes first and second inner electrodes 121 and 122 which have been described with reference to FIG. 3. Also, a second capacitor includes third and fourth inner electrodes 123 and 124 which have been described with reference to FIG. 3. From a corresponding one of the inner electrodes closest to a mounting surface, the inner electrodes are laminated in an order of (121-122-123-124-...)/(123-124-123-124-...)/(121-122-123-124-...). Moreover, the alternate laminated portions P1 and P3 are disposed symmetrically with respect to the capacitance adjusting portion P2 in a laminated direction. That is, the upper and lower parts of the multilayer chip capacitor 100' are symmetrical to each other. This ensures the multilayer chip capacitor 100' to be mounted in symmetry, thereby allowing the capacitor to be mounted on the circuit board 150 without a need for distinguishing top and bottom surfaces thereof.

Figure 10:
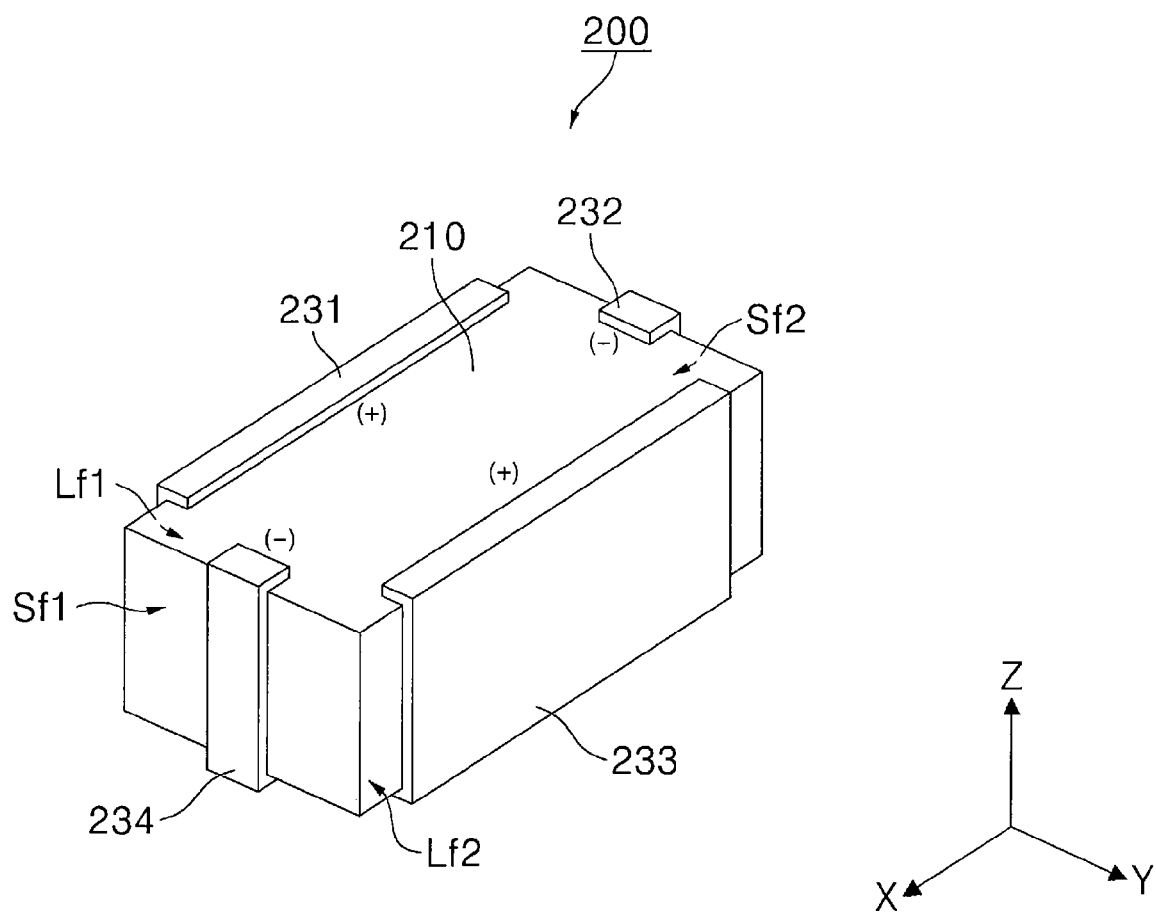
FIG. 10 is a perspective view illustrating a multilayer chip capacitor according to another exemplary embodiment of the invention.
Figure 11:
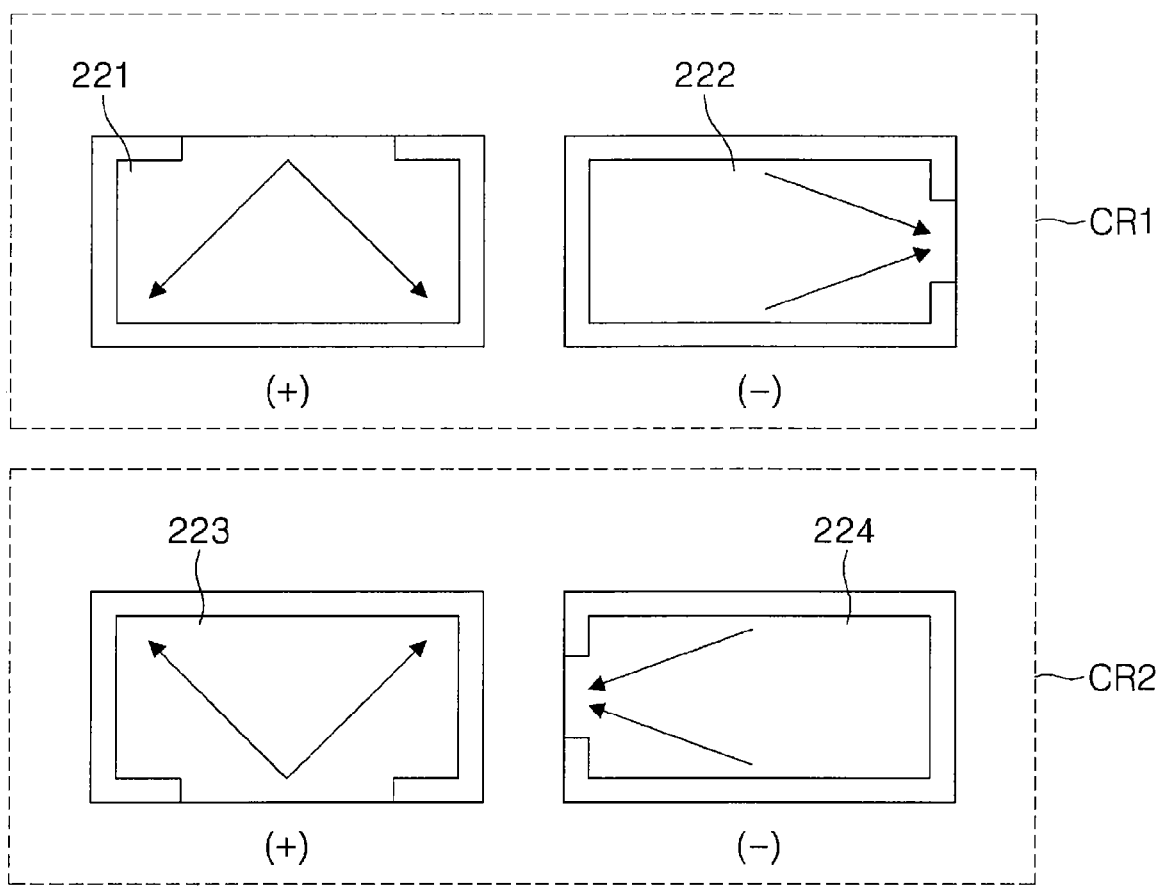
FIG. 11 is a plan view illustrating an electrode structure and a current flow of the multilayer chip capacitor shown in FIG. 10.

FIG. 10 is a perspective view illustrating a multilayer chip capacitor according to another exemplary embodiment of the invention. FIG. 11 is a plan view illustrating an electrode structure and a current flow of the multilayer chip capacitor shown in FIG. 10. First, referring to FIG. 10, the multilayer chip capacitor 200 of the present embodiment is shaped identically to the capacitor 100 of FIG. 3 but different in terms of the arrangement of outer electrodes. As for first and second outer electrodes 231 and 232 connected to a first capacitor unit CR1, the first outer electrode 231 of positive (+) polarity is formed on a first longer side surface Lf1 of the capacitor body 210 and the second outer electrode of negative (−) polarity is formed on a second shorter side surface Sf2. As for third and fourth outer electrodes 233 and 234 connected to a second capacitor unit CR2, the third outer electrode 233 of positive (+) polarity is formed on a second longer side surface Lf2 of the capacitor body 210 and a fourth outer electrode 234 of negative (−) polarity is formed on a first shorter side surface Sf1. This leads to a different configuration of the inner electrodes from the previous embodiment.

That is, referring to FIG. 11, the first and second inner electrodes 221 and 222 of the first capacitor CR1 are connected to the first and second outer electrodes 231 and 232, respectively. The first and second inner electrodes 221 and 222 of the first capacitor CR1 are configured identically to those of FIG. 11 due to the first and second outer electrodes 231 and 232 formed on the first longer side surface and the second shorter side surface of the capacitor body 210, respectively as described above. Likewise, third and fourth inner electrodes 223 and 224 of the second capacitor CR2 are disposed as depicted in a lower part of FIG. 11. In the present embodiment, a current flows in each of the inner electrodes 221 to 224 on a shorter path than a current flowing as shown in FIG. 7. Accordingly, this ensures a further decrease in ESL.

Figure 12:
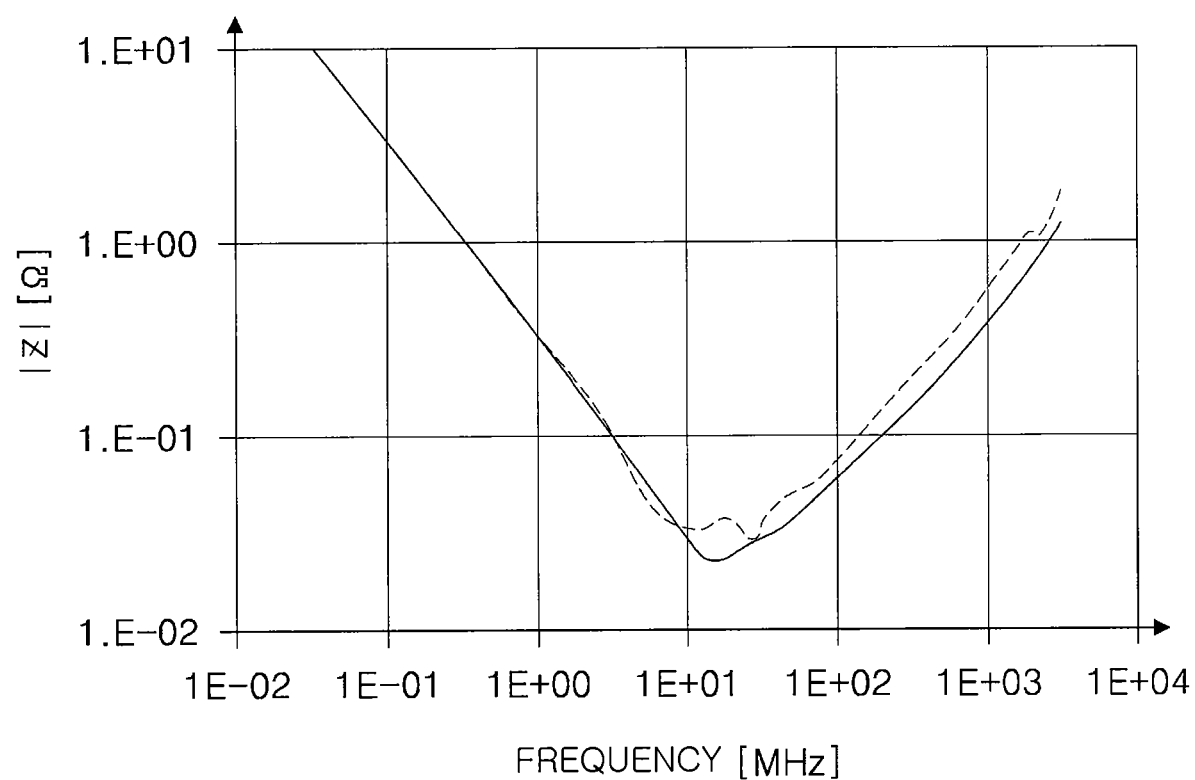
FIG. 12 is a simulation graph for comparing impedance characteristics between the multilayer chip capacitor (solid line) of FIG. 10 and a conventional multilayer chip capacitor (dotted line)

FIG. 12 is a simulation graph for comparing impedance characteristics between the multilayer chip capacitor (solid line) of FIG. 10 and a conventional multilayer chip capacitor (dotted line). Here, the conventional multilayer chip capacitor has a structure such that first and second capacitor units are not laminated alternately but separated from each other. Referring to FIG. 12, the multilayer chip capacitor having a structure of FIG. 10 exhibits low impedance at a high frequency, particularly, a resonant frequency or more compared with the conventional multilayer chip capacitor.

Figure 13:
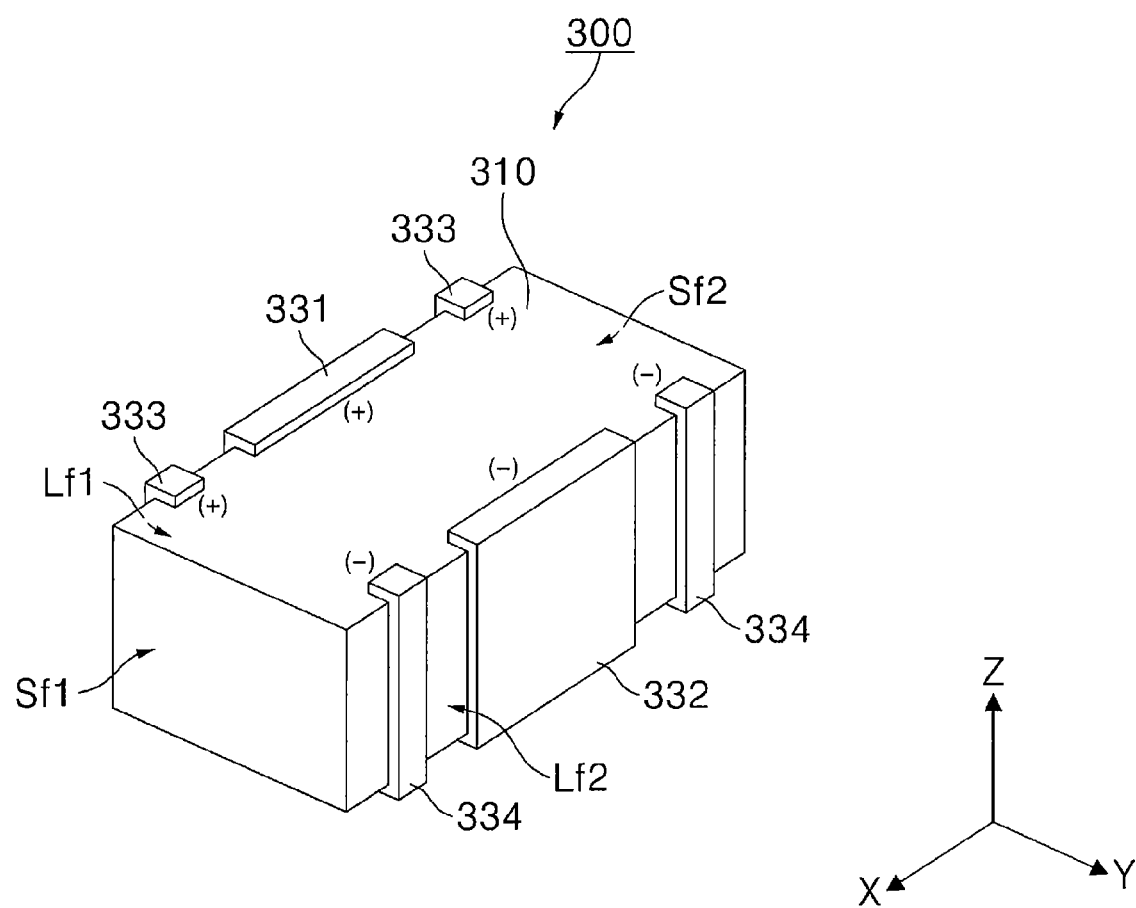
FIG. 13 is a perspective view illustrating a multilayer chip capacitor according to still another exemplary embodiment of the invention.
Figure 14:
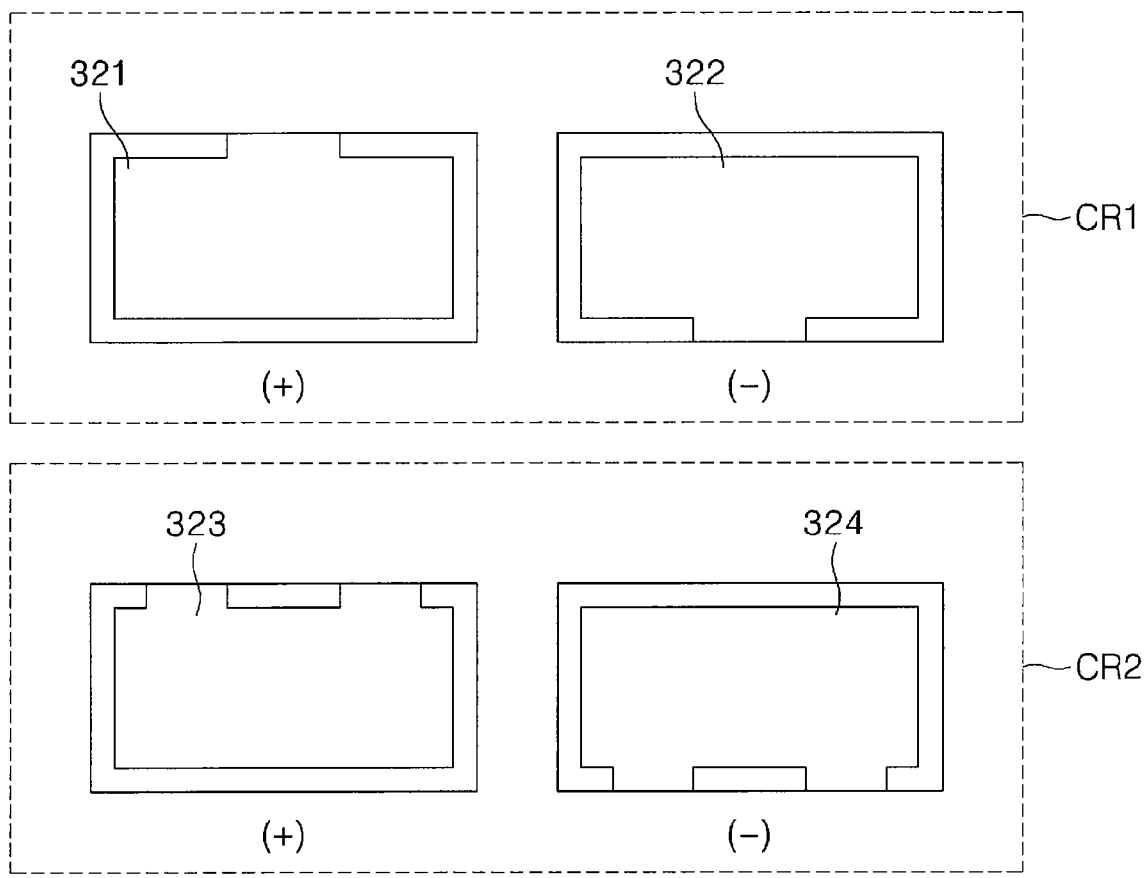
FIG. 14 is a plan view illustrating an inner electrode structure of the multilayer chip capacitor shown in FIG. 13.

FIG. 13 is a perspective view illustrating a multilayer chip capacitor according to still another exemplary embodiment of the invention. FIG. 14 is a plan view illustrating an inner electrode structure of the multilayer chip capacitor shown in FIG. 13.

Referring to FIG. 13, in the multilayer chip capacitor 300 of the present embodiment, a first outer electrode 331 with positive (+) polarity and two third outer electrodes 333 with positive (+) polarity are formed on a first longer side surface Lf1 of a capacitor body 310. Also, a second outer electrode 332 with negative (−) polarity and two fourth outer electrodes 334 with negative (−) polarity are formed on a second longer side surface Lf2. That is, in the present embodiment, the first and fourth outer electrodes 331 to 334 are formed only on the longer side surfaces Lf1 and Lf2 of the capacitor body 310, respectively. Here, the first outer electrode 331 is disposed between the two third outer electrodes 333 and the second outer electrode 332 is disposed between the two fourth outer electrodes 334. Also, as shown in FIG. 14, the first to fourth inner electrodes 321 to 324 include leads through which the first to fourth outer electrodes 331 to 334 are connected thereto, respectively. This arrangement of the outer electrodes and inner electrodes according to the present embodiment ensures the chip to be vertically symmetrical to each other. Meanwhile, the first and second capacitor units CR1 and CR2 are slightly different in terms of ESL, and thus unlike the previous embodiment, any of the first and second capacitor units CR1 and CR2 may be disposed first on the capacitor body 310. The multilayer chip capacitor 300 is a six terminal multilayer chip capacitor having the outer electrodes formed only on the first and second longer side surfaces Lf1 and Lf2 to ensure higher mounting density. The present embodiment is different from the previous embodiment in the arrangement configuration of the outer electrodes and inner electrodes. The first to fourth inner electrodes 321 to 324 may be laminated identically to the previous embodiments. That is, the capacitor is divided into the first and second capacitor units CR1 and CR2 having different capacitances, and the inner electrodes are laminated in a different configuration for the alternate laminated portion (first and second capacitor units) and for the capacitance adjusting portion (first or second capacitor unit). This is equally applied to embodiments of FIGS. 15 to 26 which will be described below.

Figure 15:
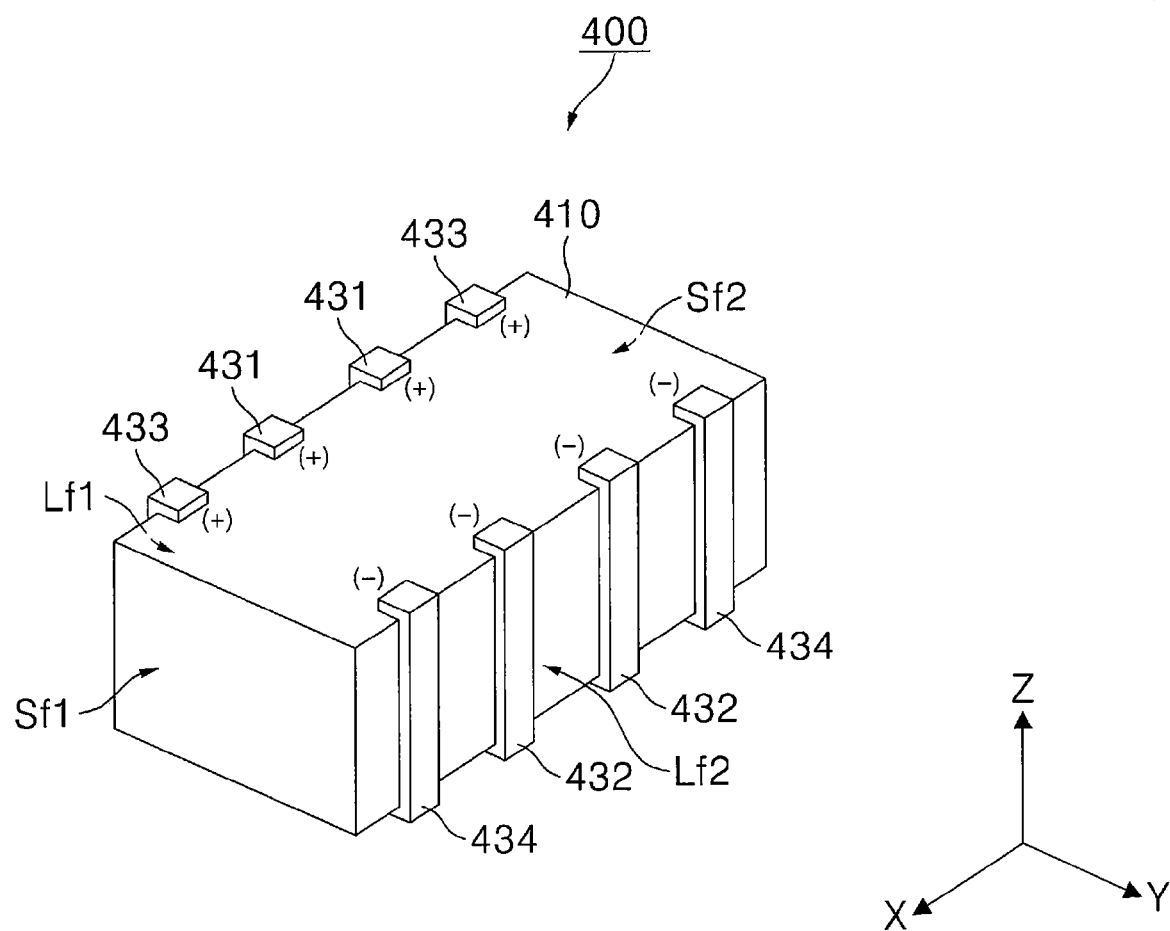
FIG. 15 is a perspective view illustrating a multilayer chip capacitor according to yet another exemplary embodiment of the invention.
Figure 16:
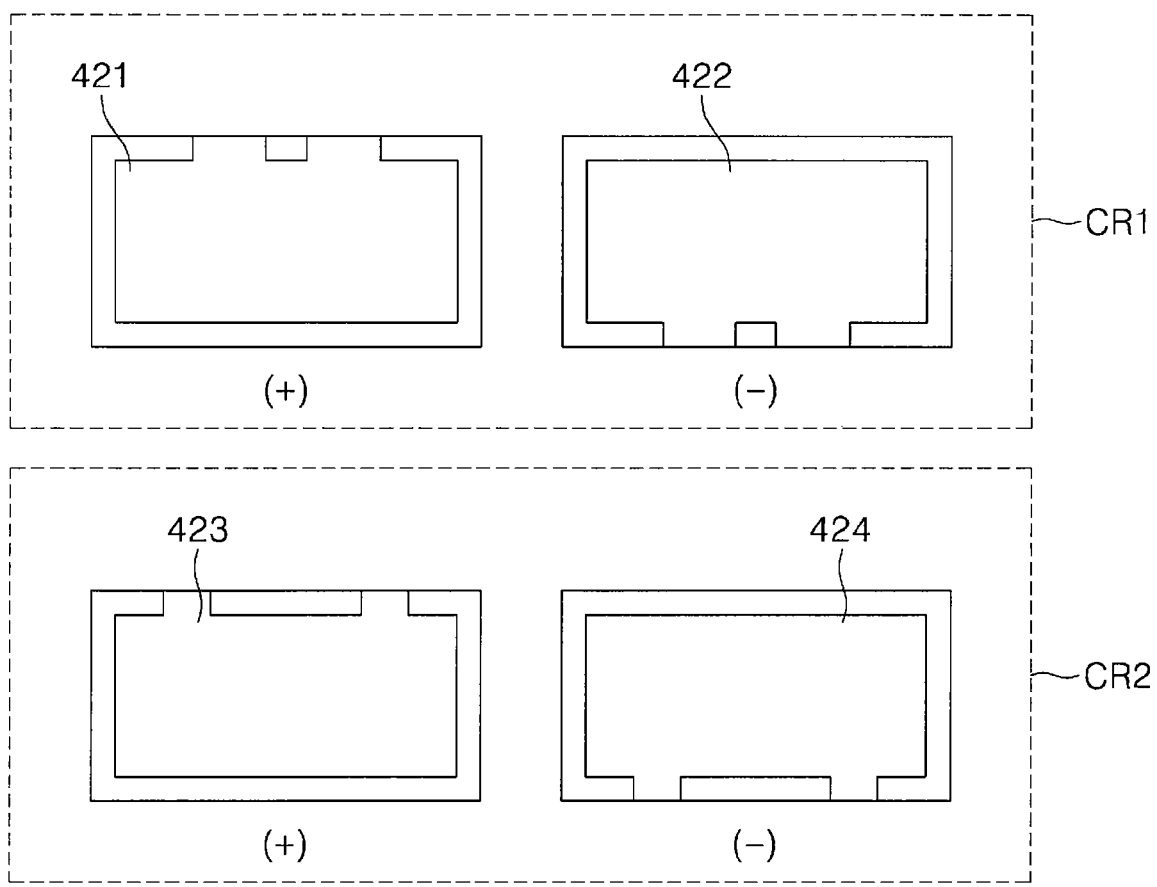
FIG. 16 is a plan view illustrating an inner electrode structure of the multilayer chip capacitor shown in FIG. 15.

FIG. 15 is a perspective view illustrating a multilayer chip capacitor according to a further exemplary embodiment of the invention. FIG. 16 is a plan view illustrating an inner electrode structure of the multilayer chip capacitor shown in FIG. 15.

Referring to FIG. 15, in the multilayer chip capacitor 400 of the present embodiment, two first outer electrodes 431 having positive (+) polarity and two third outer electrodes 433 having positive (+) polarity are formed on a first longer side surface Lf1 of the capacitor body 410. Also, two second outer electrodes 432 having negative (−) polarity and two fourth outer electrodes 434 having negative (−) polarity are formed on a second longer side surface Lf2, thereby providing an eight terminal multilayer chip capacitor (MLCC). At this time, the first outer electrodes 431 are disposed between the two third outer electrodes 433. The second outer electrodes 432 are disposed between the two fourth outer electrodes 434. Accordingly, this ensures the chip to be in vertical symmetry in the same manner as FIG. 13. Moreover, as shown in FIG. 16, first to fourth inner electrodes 421 to 424 include leads for connecting the first to fourth outer electrodes 431 to 334 thereto, respectively. Here, the first and second capacitor units CR1 and CR2 are connected to the outer electrodes formed on the longer side surfaces Lf1 and Lf2 of the capacitor body 410 and exhibit little difference in ESL. Thus, any one of the first and second capacitor units CR1 and CR2 may be disposed first in the alternate laminated portion.

Figure 17:
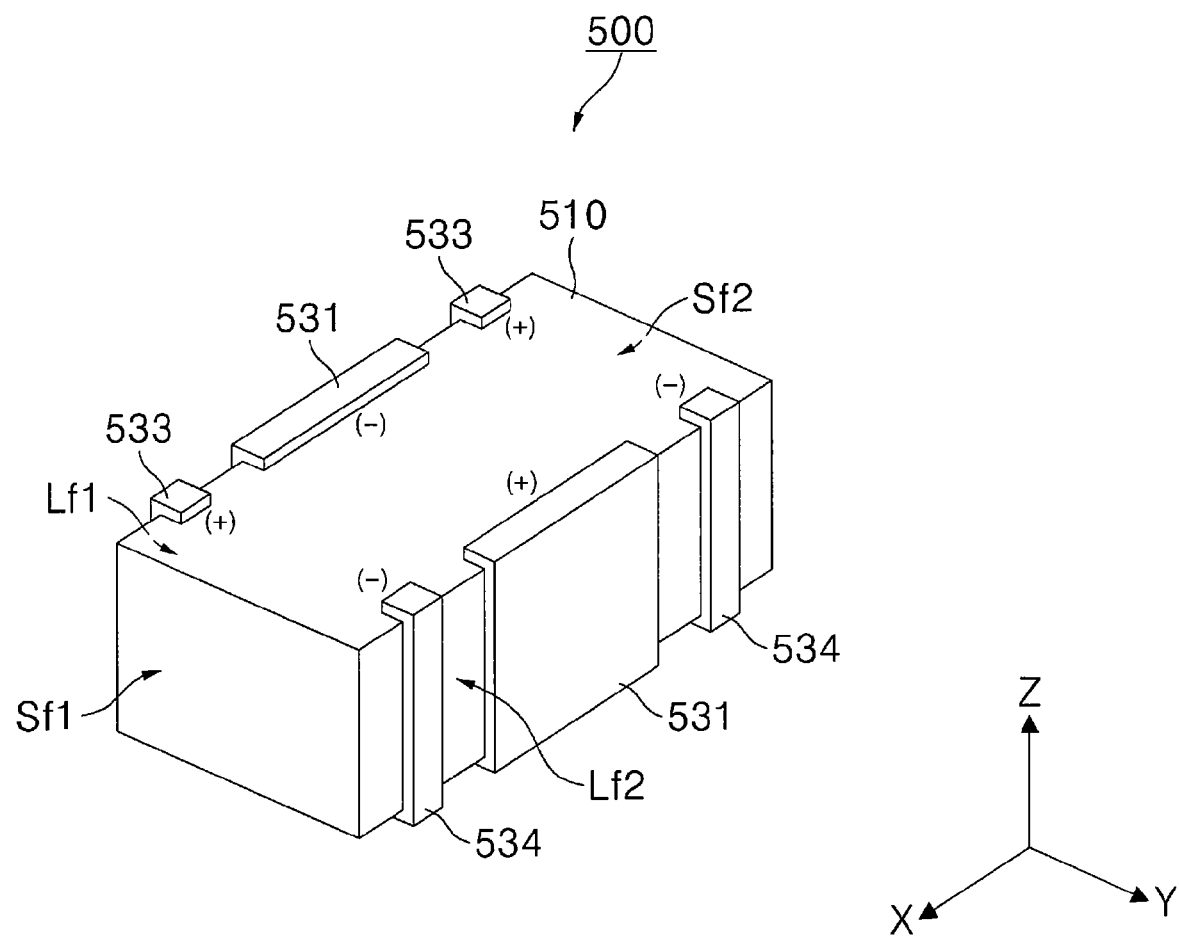
FIG. 17 is a perspective view illustrating a multilayer chip capacitor according to a further exemplary embodiment of the invention.
Figure 18:
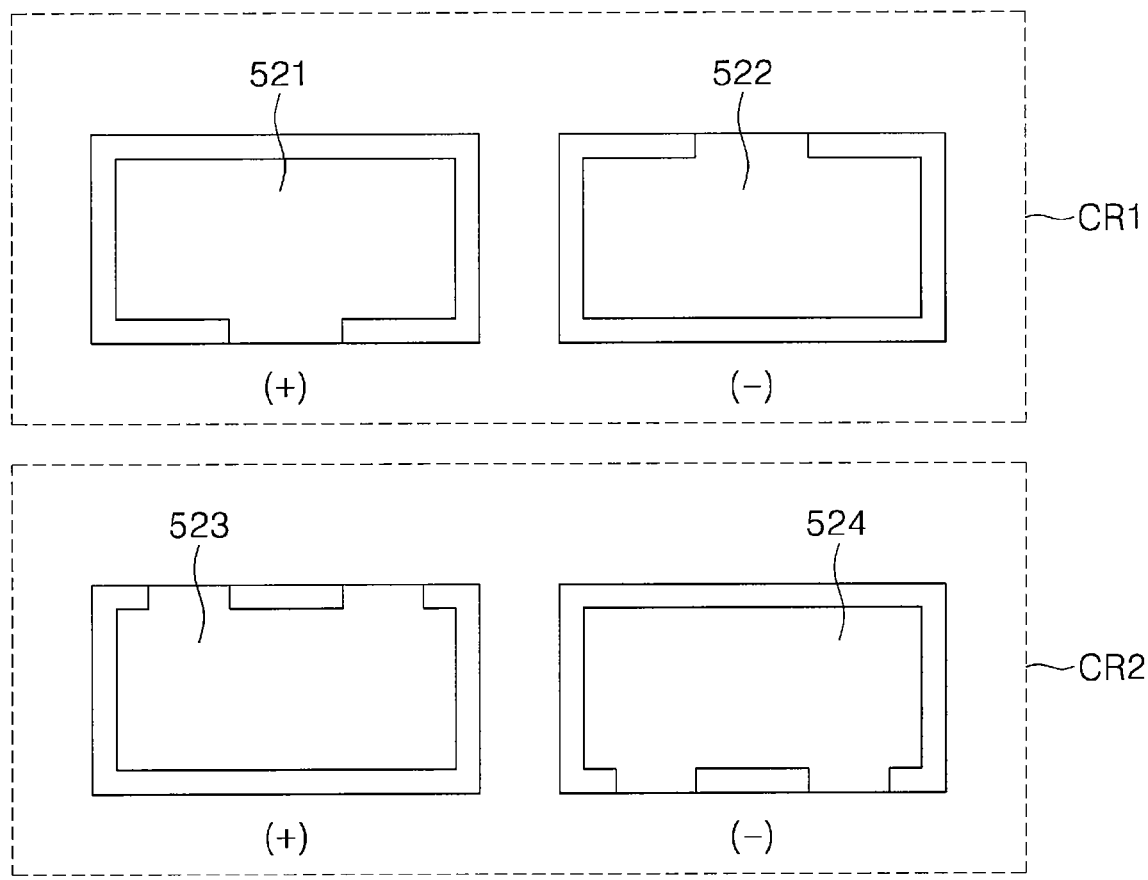
FIG. 18 is a plan view illustrating an inner electrode structure of the multilayer chip capacitor shown in FIG. 17.

FIG. 17 is a perspective view illustrating a multilayer chip capacitor according to a further exemplary embodiment of the invention. FIG. 18 is a plan view illustrating an inner electrode structure of the multilayer chip capacitor shown in FIG. 17.

In the present embodiment, the multilayer chip capacitor is shaped identically to the multilayer chip capacitor of FIG. 13 but different in the arrangement of outer electrodes and the configuration of inner electrodes. Referring to FIG. 17, in the multilayer chip capacitor 500 of the present embodiment, a second outer electrode 532 having negative (−) polarity and two third outer electrodes 533 having positive (+) polarity are formed on a first longer side surface Lf1 of a capacitor body 510. A first outer electrode 531 having positive (+) polarity and two fourth outer electrodes 534 having negative (−) polarity are formed on a second longer side surface Lf2. Here, the second outer electrode 532 is disposed between the two third outer electrodes 533 and the first outer electrode 531 is disposed between the two fourth outer electrodes 534. That is, the outer electrodes with different polarities are arranged alternately on the longer side surfaces Lf1 and Lf2 of the capacitor body 510, respectively. As shown in FIG. 18, first to fourth inner electrodes 521 to 524 include leads for connecting the first to fourth outer electrodes 531 to 534 thereto, respectively. In the same manner as the previous embodiments, this allows the chip to be in vertical symmetry. Particularly, referring to FIG. 18, currents flow through adjacent ones of the inner electrodes 521 to 524 in opposite directions to cancel magnet flux out, thereby reducing ELS. Also, first and second capacitor units CR1 and CR2 are slightly different in ESL and thus either of them can be disposed first in the alternate laminated portion.

Figure 19:
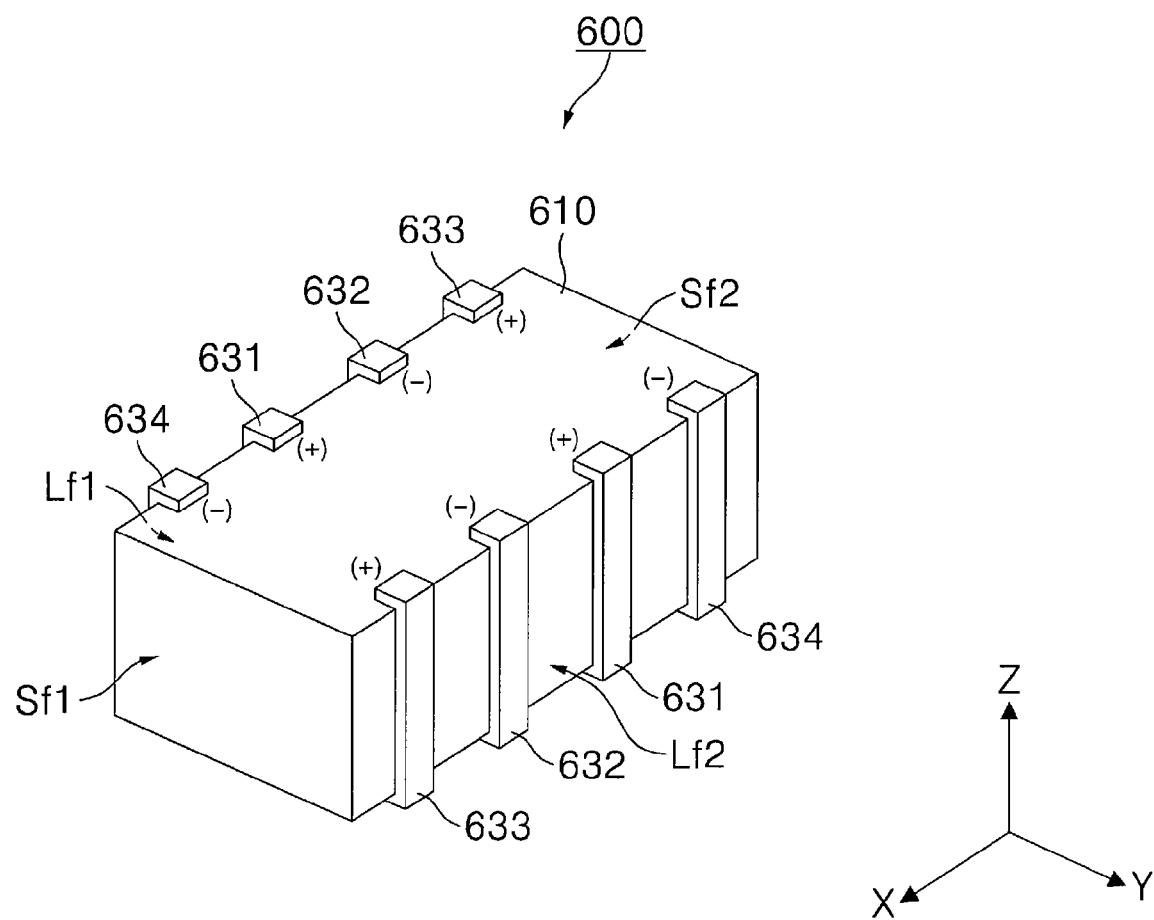
FIG. 19 is a perspective view illustrating a multilayer chip capacitor according to a further exemplary embodiment of the invention.
Figure 20:
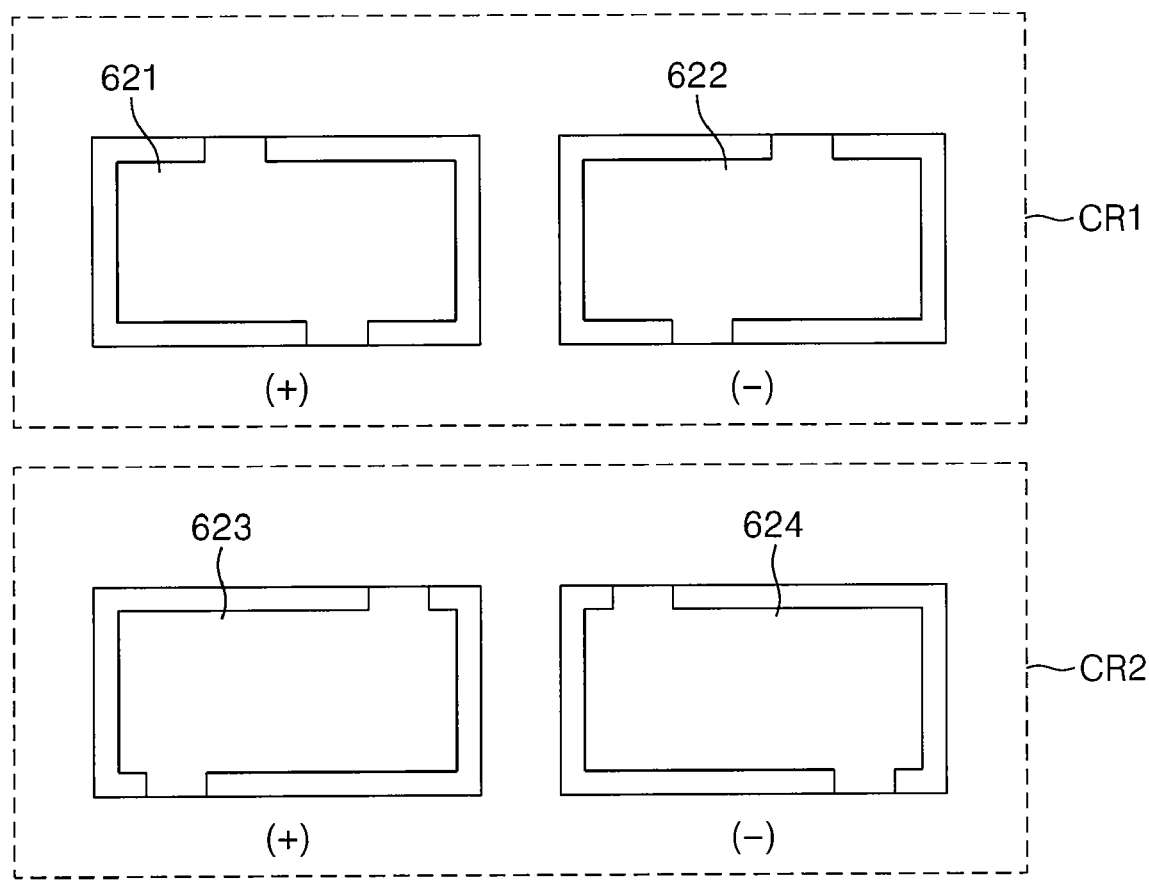
FIG. 20 is a plan view illustrating an inner electrode structure of the multilayer chip capacitor shown in FIG. 19.

FIG. 19 is a perspective view illustrating a multilayer chip capacitor according to a further exemplary embodiment of the invention. FIG. 20 is a plan view illustrating an inner electrode structure of the multilayer chip capacitor shown in FIG. 19.

In the present embodiment, the multilayer chip capacitor is shaped identically to the multilayer chip capacitor of FIG. 15 but different in the arrangement of outer electrodes and the configuration of inner electrodes. Referring to FIG. 19, the multilayer chip capacitor 600 of the present embodiment includes respective two first to fourth outer electrodes 631 to 634. Respective single ones of the first to fourth outer electrodes 631 and 634 are formed on a first longer side surface Lf1 of the capacitor body and the other ones of the first to fourth outer electrodes 631 and 634 are formed on a second longer side surface Lf2 of the capacitor body 610. Here, the first and second outer electrodes 631 and 632 are disposed between the third and fourth outer electrodes 633 and 634 but the outer electrodes of different polarities are arranged alternately to ensure the chip is in vertical symmetry. Also, as shown in FIG. 20, the first to fourth inner electrodes 621 to 624 include leads for connecting the first to fourth outer electrodes 631 to 634 thereto, respectively. Currents flow in adjacent ones of the inner electrodes 621 to 624 in opposite directions to cancel magnetic flux out, thereby reducing ESL. Here, the first and second capacitor units CR1 and CR2 are slightly different in ESL and thus any one of the first and second capacitor units CR1 and CR2 may be disposed first in an alternate laminated portion.

Figure 21:
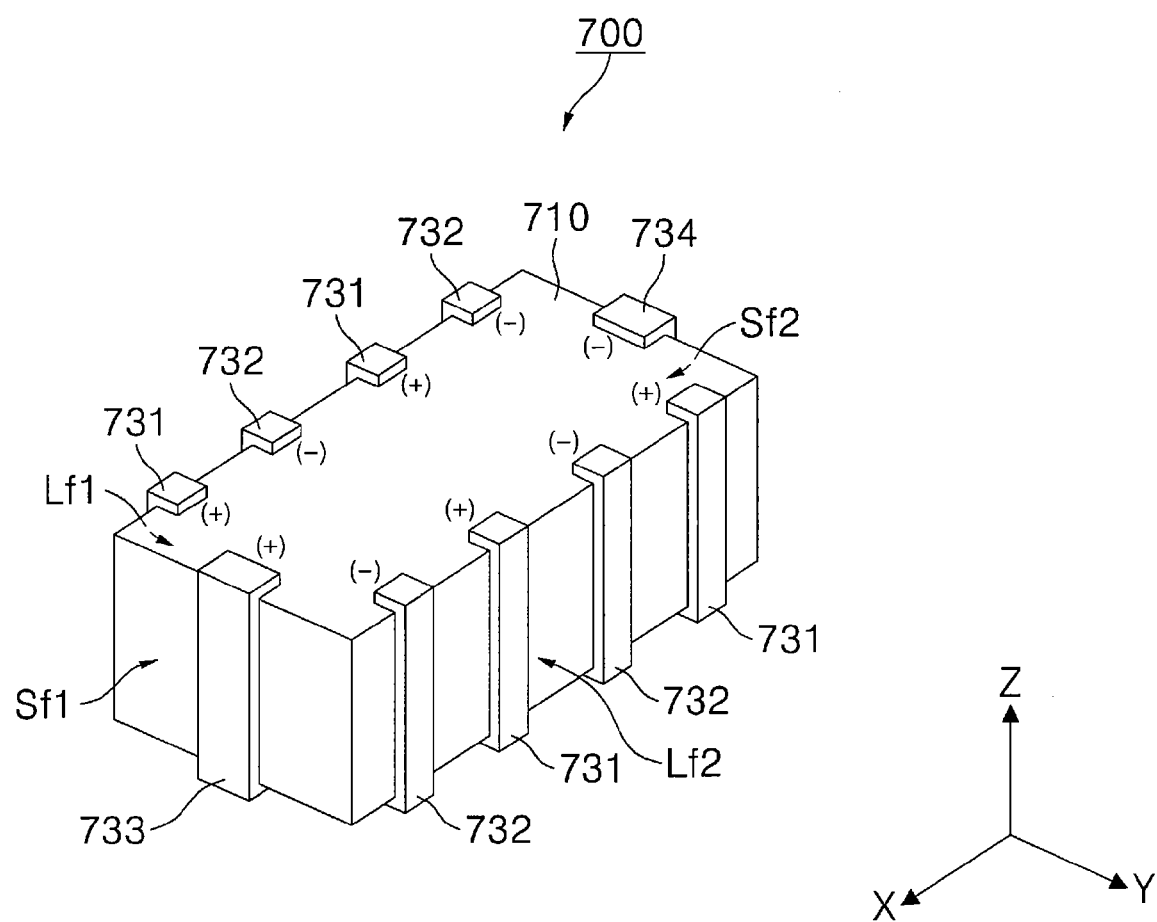
FIG. 21 is a perspective view illustrating a multilayer chip capacitor according to a further exemplary embodiment of the invention.
Figure 22:
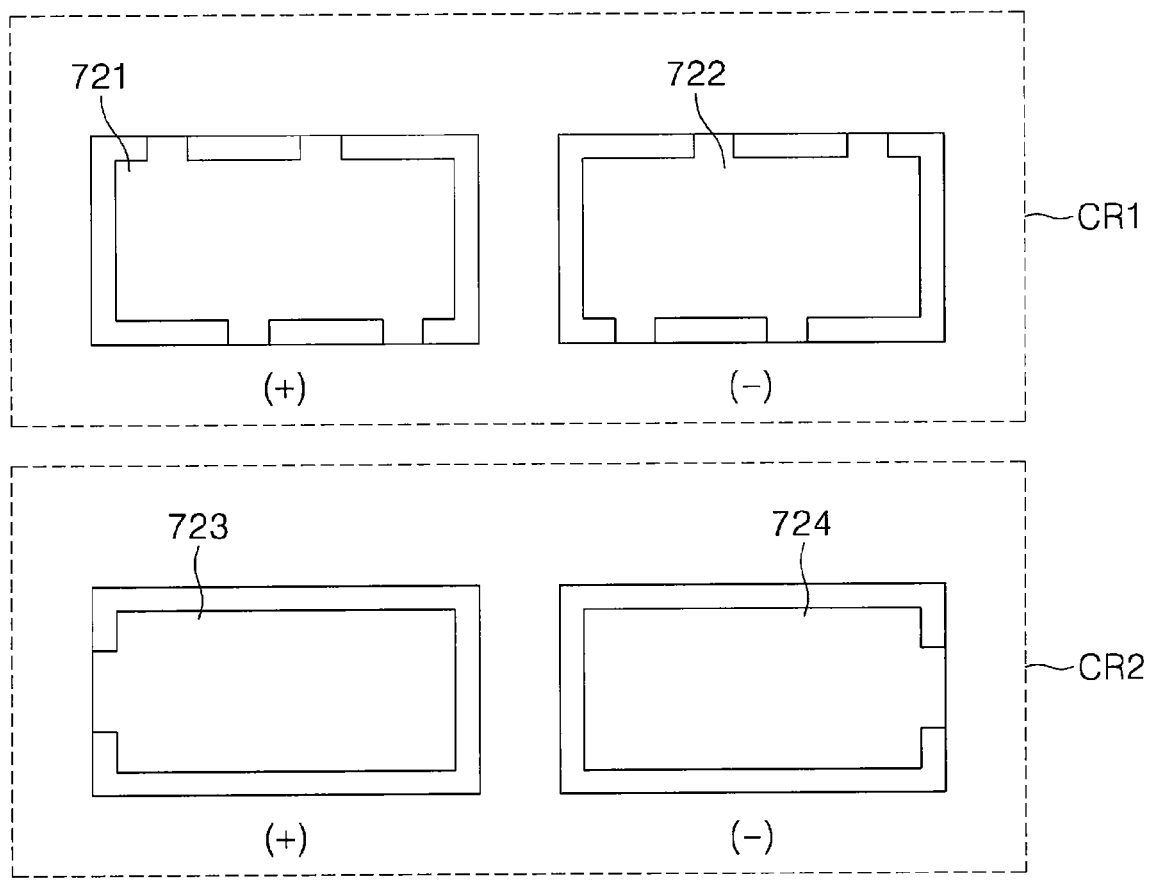
FIG. 22 is a plan view illustrating an inner electrode structure of the multilayer chip capacitor shown in FIG. 21.
Figure 23:
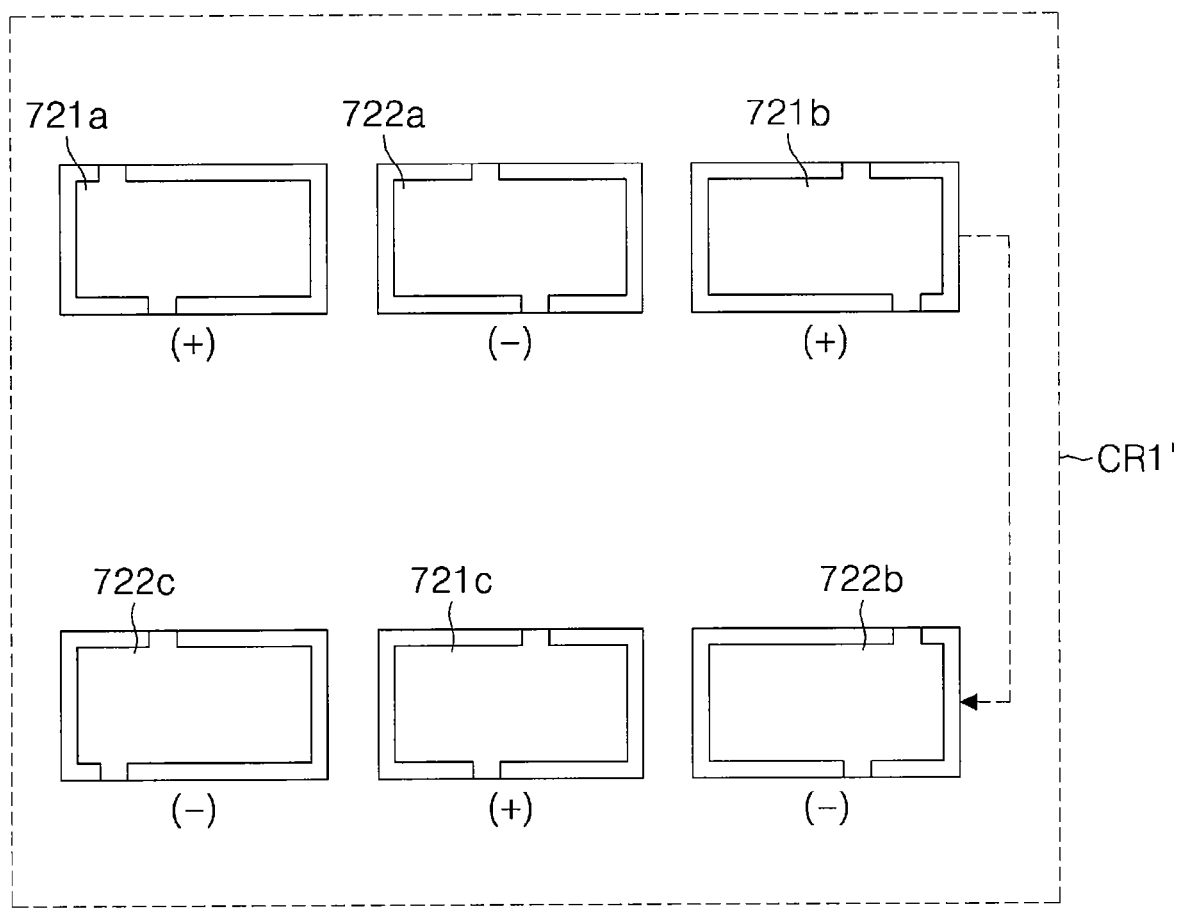
FIG. 23 is a plan view illustrating an inner electrode structure of the multilayer chip capacitor shown in FIG. 21.

FIG. 21 is a perspective view illustrating a multilayer chip capacitor according to a further exemplary embodiment of the invention. FIG. 22 is a plan view illustrating an inner electrode structure of the multilayer chip capacitor shown in FIG. 21. FIG. 23 is a plan view illustrating an inner electrode structure of the multilayer chip capacitor shown in FIG. 21.

Referring to FIG. 21, the multilayer chip capacitor 700 of the present embodiment includes respective four first and second outer electrodes 731 and 732. Two of the first outer electrodes 731 and two of the second outer electrodes 732 are formed alternately on a first longer side surface Lf1 of a capacitor body 710 and the other two first outer electrodes 731 and the other two second outer electrodes 732 are formed alternately on a second longer side surface Lf2 of the capacitor body 710. Also, third and fourth outer electrodes 733 and 734 are formed on first and second shorter side surfaces Sf1 and Sf2 of the capacitor body 710, respectively to constitute a ten-terminal multilayer chip capacitor (MLCC). As shown in FIG. 22, the first and second inner electrodes 721 and 722 each include four leads. The leads of the first inner electrode 721 are arranged adjacent to the leads of the inner electrodes 722 in an interdigitated configuration, and connected to the outer electrodes 731 and 732 of identical polarity through the leads. With this interdigitated configuration, in the first capacitor unit CR1, magnetic fluxes are cancelled out in adjacent ones of the inner electrodes to further reduce ESL.

Meanwhile, in the first capacitor unit, inner electrodes may be configured as shown in FIG. 23. Referring to FIG. 23, the first capacitor unit CR1' includes three first inner electrodes 721a to 721c of positive (+) polarity and three second inner electrodes 722a to 722c of negative (−) polarity arranged alternately on each of first and second longer side surfaces. Here, the first and second inner electrodes 721a to 721c; 722a to 722c are connected to outer electrodes of identical polarity by a respective one lead. Here, the inner electrodes of identical polarity are electrically connected to one another. As shown in FIG. 23, the leads of the first and second inner electrodes 721a to 721c; 722a to 722c are arranged in a zigzag shape in a laminated direction. This zigzag configuration can reduce mutual inductance of the leads adjacent to each other in a laminated direction and having identical polarity.

In the inner electrodes 721a to 721c; 722a to 722c, a corresponding one of the leads led out to the first longer side surface Lf1 is arranged shifted to a position corresponding to the outer electrode immediately adjacent thereto, with respect to another corresponding lead led out to the second longer side surface Lf2. This zigzag arrangement and shifted arrangement of the leads allow the inner electrodes of identical polarity in the first capacitor unit CR1 to be electrically connected to one another. Also, according to the present embodiment, in the first capacitor unit CR1, the leads of the first and second inner electrodes, for example, 721a and 722a adjacent to each other in a laminated direction are disposed adjacent to each other in a laminated direction.

Figure 24:
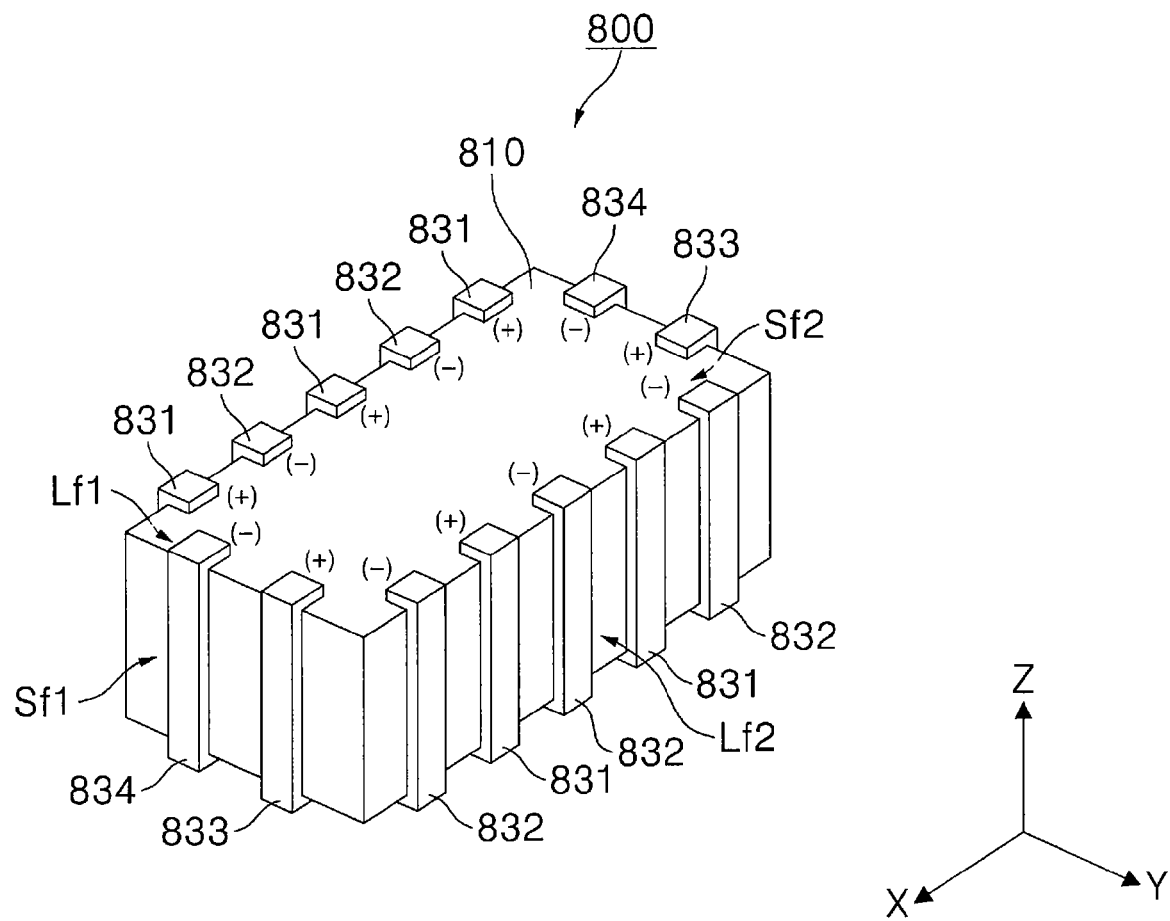
FIG. 24 is a perspective view illustrating a multilayer chip capacitor according to a further exemplary embodiment of the invention.
Figure 25:
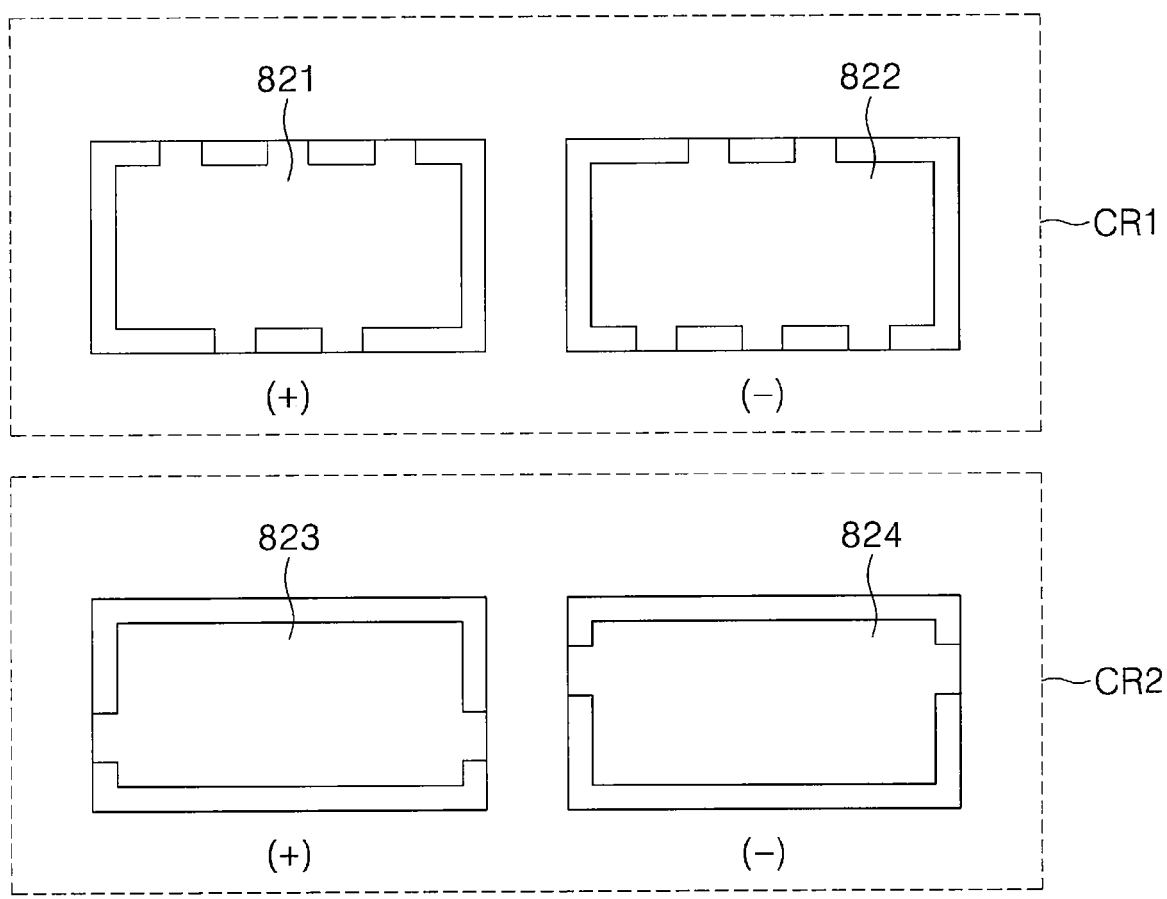
FIG. 25 is a plan view illustrating an inner electrode structure of the multilayer chip capacitor shown in FIG. 24.
Figure 26:
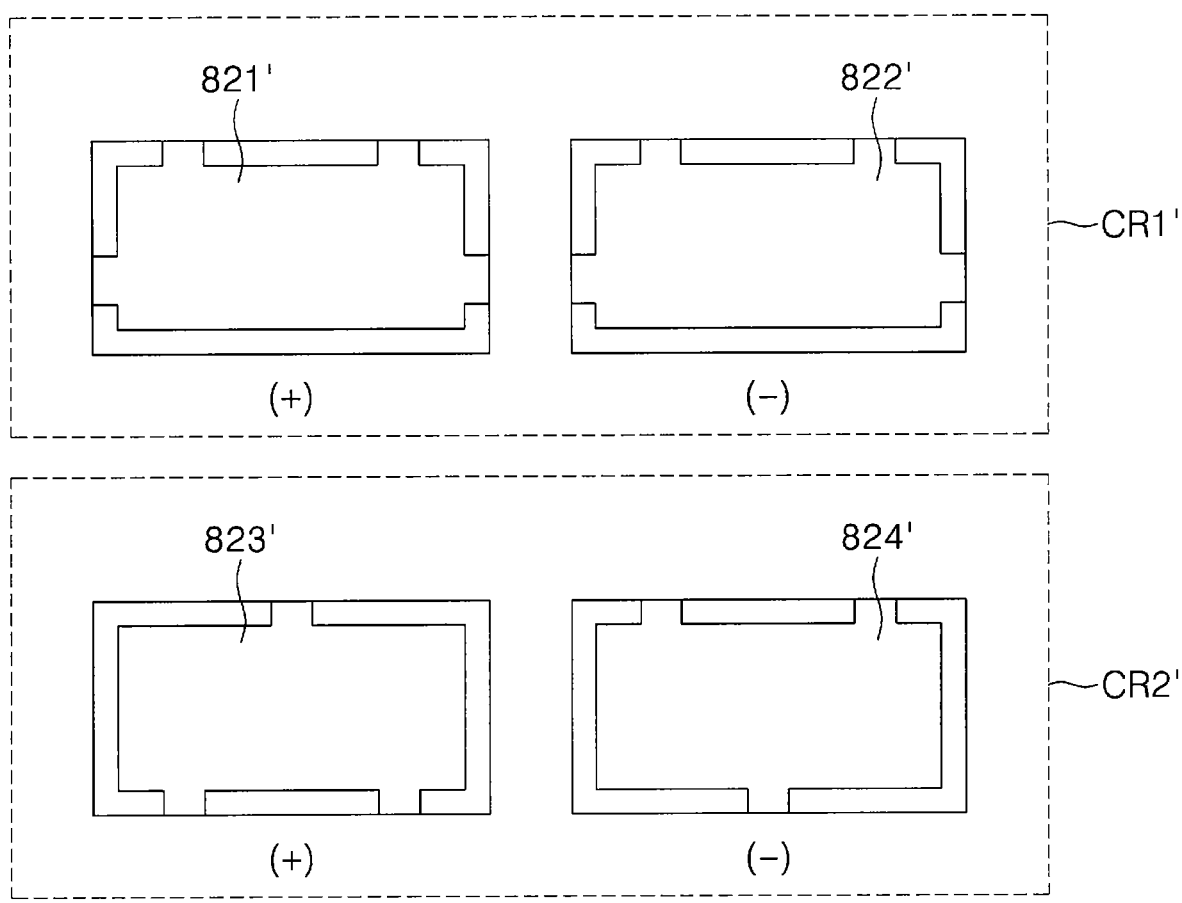
FIG. 26 is a plan view illustrating an inner electrode structure of the multilayer chip capacitor shown in FIG. 24.

FIG. 24 is a perspective view illustrating a multilayer chip capacitor according to a further exemplary embodiment of the invention. FIG. 25 is a plan view illustrating an inner electrode structure of the multilayer chip capacitor shown in FIG. 24. FIG. 26 is a plan view illustrating an inner electrode structure of the multilayer chip capacitor shown in FIG. 24.

Referring to FIG. 24, the multilayer chip capacitor 800 of the present embodiment includes respective five first and second outer electrodes 831 and 832. The first and second outer electrodes 831 and 832 are arranged alternately on each of first and second longer side surfaces Lf1 and Lf2 of a capacitor body 810. Also, a respective one of third and fourth outer electrodes 833 and 834 is formed on each of first and second shorter side surfaces Sf1 and Sf2 of the capacitor body 810 to constitute a fourteen-terminal multilayer chip capacitor (MLCC). As shown in FIG. 25, five leads of the first inner electrode 821 are arranged adjacent to five leads of the second inner electrode 822 in an interdigitated configuration, and the first and second inner electrodes 821 and 822 are connected to the outer electrodes 831 and 832 of identical polarity through the leads.

With this interdigitated configuration, in the first capacitor unit CR1, magnetic fluxes are cancelled out each other in adjacent ones of the inner electrodes to further reduce ESL. Meanwhile, as shown in FIG. 26, the first and second inner electrodes 821' and 822' of the first capacitor unit CR1' may be connected to the longer side surface and shorter side surface, respectively. Also, the third and fourth inner electrodes 823' and 824' of the second capacitor unit CR2' may be connected only to the longer side surface.

As set forth above, according to exemplary embodiments of the invention, a single capacitor is employed to reduce a PDN impedance to a target impedance or less in a wide frequency range from hundreds of kHz to hundreds of MHz. Thus significantly reduces the number of decoupling capacitors utilized in a digital switching circuit such as a high speed MPU and ensures the decoupling capacitors to be effectively mounted in a less space and at a lower cost. Also, the multilayer chip capacitor including capacitor units with different capacitances as a single chip is prevented from a decline in capacitance.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
   a capacitor body having a plurality of dielectric layers laminated therein, the capacitor body comprising first and second capacitor units having capacitances different from each other; and
   first to fourth outer electrodes formed on an outer surface of the capacitor body,
   wherein the first capacitor unit comprises at least one pair of first and second inner electrodes opposing each other while interposing a corresponding one of the dielectric layers, the first and second inner electrodes connected to the first and second outer electrodes, respectively to have polarities different from each other,
   the second capacitor unit comprises at least one pair of third and fourth inner electrodes opposing each other while interposing another corresponding one of the dielectric layers, the third and fourth inner electrodes connected to the third and fourth outer electrodes, respectively to have polarity identical to the first and second inner electrodes,
   an alternate laminated portion is formed in one area within the capacitor body, the alternate laminated portion having the first to fourth inner electrodes sequentially laminated therein, and
   a capacitance adjusting portion is formed in another area within the capacitor body, the capacitance adjusting portion having at least one of the one pair of first and second inner electrodes and the one pair of third and fourth inner electrodes laminated repeatedly.

2. The multilayer chip capacitor of claim 1, wherein the alternate laminated portion is disposed in a lower part of the capacitor body and the capacitance adjusting portion is disposed above the alternate laminated portion.

3. The multilayer chip capacitor of claim 1, wherein the alternate laminated portion comprises two alternate laminated portions disposed on upper and lower parts of the capacitor body, respectively and the capacitance adjusting portion is disposed between the alternate laminated portions.

4. The multilayer chip capacitor of claim 3, wherein the alternate laminated portions disposed in the upper and lower parts of the capacitor body are symmetrical to each other about a center of the capacitor body.

5. The multilayer chip capacitor of claim 1, wherein the capacitance adjusting portion comprises the at least one pair of third and fourth inner electrodes laminated repeatedly.

6. The multilayer chip capacitor of claim 5, wherein the second capacitor unit has a capacitance greater than a capacitance of the first capacitor unit.

7. The multilayer chip capacitor of claim 1, wherein the one pair of first and second inner electrodes in the first capacitor unit define one layer, and the one pair of third and fourth inner electrodes in the second capacitor unit define another layer,
   wherein an equivalent series inductance per layer of the first and second inner electrodes is smaller than an equivalent series inductance per layer of the third and fourth inner electrodes.

8. The multilayer chip capacitor of claim 7, wherein the one pair of the first and second inner electrodes are disposed in a lowermost part of the alternate laminated portion.

9. The multilayer chip capacitor of claim 1, wherein the first to fourth inner electrodes comprise leads for connecting the first to fourth outer electrodes thereto, respectively,
   wherein the leads of the first and second inner electrodes have widths greater than widths of the leads of the third and fourth inner electrodes.

10. The multilayer chip capacitor of claim 1, wherein the first to fourth inner electrodes comprise leads for connecting the first to fourth outer electrodes thereto, respectively,
    wherein the leads of the first and second inner electrodes have widths identical to each other and the leads of the third and fourth inner electrodes have widths identical to each other.

11. The multilayer chip capacitor of claim 1, wherein the first and second capacitor units are electrically insulated from each other.

12. The multilayer chip capacitor of claim 1, wherein adjacent ones of the first to fourth inner electrodes of the alternate laminated portion have a distance identical to a distance between the alternate laminated portion and the capacitance adjusting portion.

13. The multilayer chip capacitor of claim 1, wherein the multilayer chip capacitor comprises a four-terminal capacitor including a respective one of the first to fourth outer electrodes.

14. The multilayer chip capacitor of claim 13, wherein the first to fourth inner electrodes are connected to the first to fourth outer electrodes through one lead, respectively.

15. The multilayer chip capacitor of claim 14, wherein the first and second outer electrodes are formed on opposing first and second longer side surfaces of the capacitor body, respectively and the third and fourth outer electrodes are formed on opposing first and second shorter side surfaces of the capacitor body, respectively.

16. The multilayer chip capacitor of claim 14, wherein the first and second outer electrodes are formed on a first longer side surface and a first shorter side surface adjacent to each other in the capacitor body, respectively, and the third outer electrode is formed on a second longer side surface opposing the first longer side surface and the fourth outer electrode is formed on a second shorter side surface opposing the first shorter side surface.

17. The multilayer chip capacitor of claim 1, wherein each of the third and fourth outer electrodes comprises two outer electrodes, and
the first and second outer electrodes are formed on opposing first and second longer side surfaces of the capacitor body and the respective two third and fourth outer electrodes are formed on the first and second longer side surfaces, respectively.

18. The multilayer chip capacitor of claim 17, wherein the first outer electrode is formed between the two third outer electrodes and the second outer electrode is formed between the two fourth outer electrodes.

19. The multilayer chip capacitor of claim 18, wherein each of the first and second outer electrodes comprises two outer electrodes.

20. The multilayer chip capacitor of claim 1, wherein each of the third and fourth outer electrodes comprises two outer electrodes,
the first and second outer electrodes are formed on opposing first and second longer side surfaces of the capacitor body, respectively and the respective two third and fourth outer electrodes are formed on the second and first longer side surfaces, respectively.

21. The multilayer chip capacitor of claim 20, wherein the first outer electrode is formed between the two fourth outer electrodes and the second outer electrode is formed between the two third outer electrodes.

22. The multilayer chip capacitor of claim 1, wherein each of the first and second outer electrodes comprises two outer electrodes, wherein respective single ones of the first and second outer electrodes are formed on opposing first and second longer side surfaces of the capacitor body, respectively, and
each of the third and fourth outer electrodes comprises two outer electrodes, wherein respective single ones of the third and fourth outer electrodes are formed on the opposing first and second longer side surfaces of the capacitor body, respectively.

23. The multilayer chip capacitor of claim 22, wherein on each of the first and second longer side surfaces, the first and second outer electrodes are disposed between the third and fourth outer electrodes.

24. The multilayer chip capacitor of claim 23, wherein corresponding ones of the outer electrodes adjacent to each other on the first and second longer side surfaces, respectively have polarities different form each other.

25. The multilayer chip capacitor of claim 1, wherein each of the first and second outer electrodes comprises four outer electrodes and respective two of the first and second outer electrodes are formed on opposing first and second longer side surfaces, respectively, and
the third and fourth outer electrodes are formed on opposing first and second shorter side surfaces of the capacitor body.

26. The multilayer chip capacitor of claim 25, wherein the first and second outer electrodes are arranged alternately on the first and second longer side surfaces, respectively.

27. The multilayer chip capacitor of claim 26, wherein each of the first and second inner electrodes includes four leads through which the first and second outer electrodes are connected thereto,
the leads of the first inner electrodes are arranged adjacent to the leads of the second inner electrodes in an interdigitated configuration to be connected to corresponding ones of the outer electrodes having identical polarity.

28. The multilayer chip capacitor of claim 26, wherein each of the first and second inner electrodes includes two leads led out to the first and second longer side surfaces, respectively and connected to the first and second outer electrodes, respectively,
in the each of the first and second inner electrodes, a corresponding one of the leads led out to the first longer side surface is arranged shifted to a position corresponding to the outer electrode immediately adjacent thereto, with respect to another corresponding lead led out to the second longer side surface, and
in the first capacitor unit, the leads led out to each of the first and second longer side surfaces are arranged in a zigzag shape with respect to each other along a laminated direction from the longer side surface.

* * * * *